United States Patent Office 3,705,160
Patented Dec. 5, 1972

3,705,160
THIAZACYCLIC HYDROXY COMPOUNDS AND
PROCESS FOR THEIR MANUFACTURE
Karl Heusler, Basel, Switzerland, and Robert Burns
Woodward, Cambridge, Mass., assignors to Ciba-Geigy
Corporation
No Drawing. Filed July 15, 1969, Ser. No. 842,028
Claims priority, application Switzerland, July 23, 1968,
10,998/68; Dec. 11, 1968, 18,508/68
Int. Cl. C07d 99/16
U.S. Cl. 260—239.1         14 Claims

ABSTRACT OF THE DISCLOSURE

The invention concerns compounds of the formula

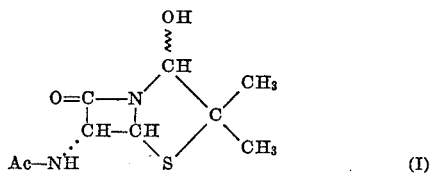

with the configuration of 6-amino-penicillanic acid, in which Ac represents the acyl radical of an organic acid, and O-esters of such compounds. They are useful as intermediates and are manufactured by splitting in a compound of the formula

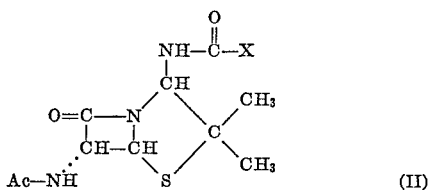

in which X is a suitably substituted hydroxy or mercapto group, such group X in the presence of water. The latter, particularly a group of the formula —O—$R_o$, in which $R_o$ is a 2-halogeno-lower alkyl residue and a starting material of that type is converted by treatment with a chemical reducing reagent, such as zinc in the presence of aqueous acetic acid.

SUMMARY OF THE INVENTION

The present invention relates to thiazacyclic hydroxy compounds, especially of 2 - hydroxy - 3,3 - dimethyl-6 - N-Ac-amino - 4 - thia-1-azabicyclo[3.2.0]heptan-7-ones (configuration of 6-amino-penicillanic acid) of the formula

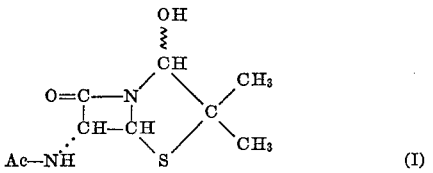

wherein Ac represents the acyl radical of an organic acid, as well as O-esters of such compounds and process for their manufacture. These compounds are valuable intermediates for the manufacture of other compounds, among other compounds having pharmacological properties. Also included are the starting materials used for the manufacture of the compounds of Formula I.

DESCRIPTION OF THE PREFERRED EMBODIMENT

A group Ac primarily represents the acyl radical of an organic carboxylic acid, especially the acyl radical of an optionally substituted aliphatic, cycloaliphatic, cycloaliphatic-aliphatic, aromatic, araliphatic, heterocyclic or heterocyclic-aliphatic carboxylic acid, as well as the acyl radical of a carbonic acid semi-derivative.

The aliphatic radical of an aliphatic carboxylic acid, which term also includes formic acid, is an optionally substituted aliphatic hydrocarbon radical, such as an alkyl, alkenyl or alkinyl radical, especially a lower alkyl or lower alkenyl radical, as well as also a lower alkynyl radical, which can, for example, contain up to 7, preferably up to 4, carbon atoms. Such radicals can optionally be monosubstituted, disubstituted or polysubstituted by functional groups, for example, by free, etherified or esterified hydroxyl or mercapto groups, such as lower alkoxy, lower alkenyloxy, lower alkylenedioxy, optionally substituted phenyloxy or phenyl lower alkoxy, lower alkylmercapto or optionally substituted phenylmercapto or phenyl-lower alkylmercapto, lower alkoxycarbonyloxy or lower alkanoyloxy groups, as well as halogen atoms, and furthermore by nitro groups, optionally substituted amino groups, acyl, such as lower alkanoyl groups, or optionally functionally modified carboxyl groups, such as carbo-lower alkoxy, optionally N-substituted carbamoyl or cyano groups.

A cycloaliphatic or cycloaliphatic-aliphatic radical of a corresponding carboxylic acid is an optionally substituted cycloaliphatic or cycloaliphatic-aliphatic hydrocarbon radical, for example, a monocyclic, bicyclic or polycyclic cycloalkyl or cycloalkenyl group or cycloalkyl- or cycloalkenyl-lower alkyl or -lower alkenyl group, wherein a cycloalkyl radical, for example, contains up to 12, such as 3–8, preferably 3–6, ring carbon atoms, whilst a cycloalkenyl radical can, for example, contain up to 12, such as 3–8, especially 5–8, preferably 5 or 6, ring carbon atoms, as well as 1 to 2 double bonds and the aliphatic part of a cycloaliphatic-aliphatic radical can, for example, contain up to 7, preferably up to 4, carbon atoms. The above cycloaliphatic or cycloaliphatic-aliphatic radicals can, if desired, be monosubstituted, disubstituted or polysubstituted, for example, by optionally substituted aliphatic hydrocarbon radicals, such as, for example, the optionally substituted lower alkyl groups mentioned above, or, for example, like the abovementioned aliphatic hydrocarbon radicals, by functional groups.

The aromatic radical of a corresponding carboxylic acid is an optionally substituted aromatic hydrocarbon radical, for example, a monocyclic, bicyclic or polycyclic aromatic hydrocarbon radical, especially a phenyl radical, as well as a biphenylyl or naphthyl radical, which can optionally be monosubstituted, disubstituted or polysubstituted, for example, like the abovementioned aliphatic and cycloaliphatic hydrocarbon radical.

The araliphatic radical in an araliphatic carboxylic acid is, for example, an optionally substituted araliphatic hydrocarbon radical, such as an optionally substituted aliphatic hydrocarbon radical which, for example, possesses up to 3 optionally substituted monocyclic, bicyclic or polycyclic aromatic hydrocarbon radicals, and primarily represents a phenyl-lower alkyl or phenyl-lower alkenyl, as well as phenyl-lower alkynyl radical, such radicals containing, for example, 1–3 phenyl groups and optionally being monosubstituted, disubstituted or polysubstituted in the aromatic and/or aliphatic portion, for example, like the abovementioned aliphatic and cycloaliphatic radicals.

Heterocyclic radicals in heterocyclic or heterocyclic-aliphatic carboxylic acids are especially monocyclic, as well as bicyclic or polycyclic, azacyclic, thiayclic, oxacyclic, thiazacyclic, oxazaylic or diazacyclic radicals of aromatic character which can optionally be monosubstituted, disubstituted or polysubstituted, for example, like the above-mentioned cycloaliphatic radicals. The aliphatic portion in heterocyclic-aliphatic radicals has, for example, the significance given for the corresponding cycloaliphatic-aliphatic or araliphatic radicals.

The acyl radical of a carbonic acid semi-derivative is preferably the acyl radical of a corresponding half-ester, wherein the esterifying organic radical represent an optionally substituted aliphatic, cycloaliphatic, aromatic or araliphatic hydrocarbon radical or a heterocyclic-aliphatic radical, primarily the acyl radical of a lower alkyl half-ester of carbonic acid which is optionally substituted, preferably in the α-position, as well as in the β-position (that is to say a carbo-lower alkoxy radical which is optionally substituted in the lower alkyl portion, preferably in the α-, as well as in the β-position), as well as a lower alkenyl, cycloalkyl, phenyl or phenyl-lower alkyl half-ester of carbonic acid which is optionally substituted in the lower alkenyl, cycloalkyl, phenyl or phenyl-lower alkyl portion, respectively (that is to say a carbo-lower alkenyloxy, carbocycloalkoxy, carbo-phenyloxy or carbo-phenyl-lower alkoxy radical which is optionally substituted in the lower alkenyl, cycloalkyl, phenyl or phenyl-lower alkyl portion, respectively). Acyl radicals of a carbonic acid half-ester are furthermore corresponding radicals of lower alkyl half-esters of carbonic acid, in which the lower alkyl portion contains a heterocyclic group, for example, one of the abovementioned heterocyclic groups of aromatic character, the lower alkyl radical and the heterocyclic group being optionally substituted. Such acyl radicals are carbo-lower alkoxy groups which are optionally substituted in the lower alkyl portion and which contain an optionally substituted heterocyclic group of aromatic character in the lower alkyl radical.

A lower alkyl radical is, for example, a methyl, ethyl, n-propyl, isopropyl, n-butyl, isobutyl, sec.-butyl or tert.-butyl, as well as n-pentyl, isopentyl, n-hexyl, isohexyl or n-heptyl group, while a lower alkenyl radical can, for example, be a vinyl, allyl, isopropenyl, 2- or 3-methallyl or 3-butenyl group, and a lower alkynyl radical, for example, a propargyl or 2-butynyl group.

A cycloalkyl group is, for example, a cyclopropyl, cyclobutyl, cyclopentyl, cyclohexyl or cycloheptyl, as well as adamantyl group, and a cyclo alkenyl group is, for example, a 2- or 3-cyclopentenyl, 1-, 2- or 3-cyclohexenyl or 3-cycloheptenyl, as well as a 2-cyclopropenyl group. A cycloalkyl-lower alkyl or -lower alkenyl radical is, for example, a cyclopropyl-, cyclopentyl-, cyclohexyl- or cycloheptyl-methyl, -1,1-ethyl or -1,2-ethyl, -1,1-propyl, -1,2-propyl or -1,3-propyl, -vinyl or -allyl group, while a cycloalkenyl-lower alkyl or -lower alkenyl group represents, for example, a 1-, 2- or 3-cyclopentyl-, 1-, 2- or 3-cyclohexenyl- or 1-, 2- or 3-cycloheptenyl-methyl, -1,1-ethyl or -1,2-ethyl, -1,1-propyl, -1,2-propyl or -1,3-propyl, -vinyl or -allyl group.

A naphthyl radical is a 1- or 2-naphthyl radical, while a biphenylyl group represents, for example, a 4-biphenylyl radical.

A phenyl-lower alkyl or phenyl-lower alkenyl radical is, for example, a benzyl, 1- or 2-phenylethyl, 1-, 2- or 3-phenylpropyl, diphenylmethyl, trityl, 1- or 2-naphthylmethyl, styryl or cinnamyl radical.

Heterocyclic radicals are, for example, monocyclic monoazacyclic, monothiacyclic or monooxacyclic radicals of aromatic character, such as pyridyl, for example, 2-pyridyl, 3-pyridyl or 4-pyridyl radicals, thienyl, for example, 2-thienyl radicals, or furyl, for example, 2-furyl radicals, or bicyclic monoazacyclic radicals of aromatic character, such as quinolinyl, for example, 2-quinolinyl or 4-quinolinyl radicals, or isoquinolinyl, for example, 1-isoquinolinyl radicals, or monocyclic thiazacyclic or oxazacyclic as well as diazacyclic radicals of aromatic character, such as oxazolyl, isoxazolyl, thiazolyl or isothiazolyl, as well as pyrimidinyl radicals. Heterocyclic-aliphatic radicals are lower alkyl or lower alkenyl radicals containing heterocyclic radicals, especially those mentioned above.

By etherified hydroxyl groups there are primarily to be understood lower alkoxy, for example, methoxy, ethoxy, n-propyloxy, isopropyloxy, n-butyloxy, isobutyloxy, sec.-butyloxy, tert.-butyloxy, n-pentyloxy or tert.-pentyloxy groups, as well as substituted lower alkoxy, such as halogeno-lower alkoxy, especially 2-halogeno-lower alkoxy, for example, 2,2,2-trichloroethoxy or 2-iodoethoxy groups, furthermore lower alkenyloxy, for example, vinyloxy or allyloxy groups, lower alkylenedioxy, for example, methylenedioxy or ethylenedioxy, as well as isopropylidenedioxy groups, cycloalkoxy, for example, cyclopentyloxy, cyclohexyloxy or adamantyloxy groups, phenyloxy groups, phenyl-lower alkoxy, for example, benzyloxy or 1- or 2-phenylethoxy groups, or lower alkoxy groups substituted by monocyclic monoazacyclic, monooxacyclic or monothiacyclic groups of aromatic character, such as pyridyl-lower alkoxy, for example, 2-pyridylmethoxy groups, furyl-lower alkoxy, for example, furfuryloxy groups, or thienyl-lower alkoxy, for example, 2-thenyloxy groups.

As etherified mercapto groups, lower alkylmercapto, for example, methylmercapto or ethylmercapto groups, phenylmercapto groups, or phenyl-lower alkylmercapto, for example, benzylmercapto groups may be mentioned.

Esterified hydroxyl groups are primarily halogen, for example, fluorine, chlorine, bromine or iodine atoms, as well as lower alkanoyloxy, for example, acetyloxy or propionyloxy groups.

Substituted amino groups are monosubstituted or disubstituted amino groups, in which the substituents primarily represent optionally substituted mono- or divalent aliphatic, cycloaliphatic, cycloaliphatic-aliphatic, aromatic or araliphatic hydrocarbon radicals, as well as acyl groups. Such amino groups are especially lower alkylamino or dilower alkylamino groups, for example, methylamino, ethylamino, dimethylamino or diethylamino groups, or lower alkyleneamino groups, which are optionally interrupted by hetero-atoms, such as oxygen or sulfur atoms or nitrogen atoms which are optionally substituted, for example, by lower alkyl groups, such as pyrrolidino, piperidino, morpholino, thiomorpholino or 4-methylpiperazino groups, as well as acylamino groups, especially lower alkanoylamino groups, such as acetylamino or propionylamino groups.

Lower alkanoyl is e.g. acetyl or propionyl.

A carbo-lower alkoxy radical is, for example, a carbo-methoxy, carbethoxy, carbo-n-propyloxy, carbo-isopropyloxy, carbo-tert.-butyloxy or carbo-tert.-pentyloxy group.

Optionally N-substituted carbamoyl groups are, for example, N-lower alkyl-carbamoyl or N,N-di-lower alkyl-carbamoyl groups, such as N-methyl-, N-ethyl-, N,N-dimethyl- or N,N-diethyl-carbamoyl groups.

A carbo-lower alkenyl radical is, for example, the carbovinyloxy group, while carbo-cycloalkoxy and carbo-phenyl-lower alkoxy groups, in which the cycloalkyl or phenyl-lower alkyl radical have the abovementioned significance, represent, for example, carbo-adamantyloxy, carbo-benzyloxy or carbo-diphenylmethoxy, as well as carbo-(α-4-biphenylyl - α - methylethoxy) groups. Carbo-lower alkoxy groups in which the lower alkyl radical contains, for example, a monocyclic monoazacyclic, monooxacyclic or monothiacyclic group are, for example, carbo-furyl-lower alkoxy, such as carbo-furfuryloxy groups, or carbo-thienyl-lower alkoxy, such as carbo-2-thenyloxy groups.

O-esters of compounds of the Formula I are esters with organic sulfonic acids, especially aliphatic or aromatic sulfonic acids, in which aliphatic and aromatic radicals have the abovementioned significance, such as lower alkanesulfonic acids, for example, methanesulfonic or ethanesulfonic acid, or arylsulfonic acids, for example, benzenesulfonic or toluenesulfonic acid, furthermore, esters with organic carboxylic acids, such as aliphatic, cycloaliphatic, cycloaliphatic-aliphatic, aromatic, araliphatic, heterocyclic or heterocyclic - aliphatic carboxylic acids, which contain the above-mentioned organic radicals, such as lower alkanecarboxylic acids, which can optionally be substituted, for example, by halogen atoms, such as formic acid, propionic acid, pivalic acid, diethylacetic acid or chloroacetic acid, cycloalkanecarboxylic acids, such as cyclopentanecarboxylic or cyclohexanecarboxylic acid, cycloalkyl-lower alkanecarboxylic acids, such as cyclohexylacetic acid, aromatic and araliphatic carboxylic acids which may optionally be substituted in the aromatic ring, for example, by lower alkyl or lower alkoxy groups, halogen atoms, or nitro, carboxyl, carbo-lower alkoxy, carbamoyl or cyano groups, for example, benzoic acid, naphthoic acid, phenylacetic acid, phenylpropionic acid or cinnamic acid, or carboxylic acids containing optionally substituted heterocyclic radicals, for example, pyridinecarboxylic, furanecarboxylic or thiophenecarboxylic acids, 2-pyridylacetic or 2-thiopheneacetic acid, as well as 3-(2-furyl)propionic acid.

The compounds of the present invention may be present in the form of mixtures of isomers or as pure isomers.

Particularly valuable compounds are those of the formula

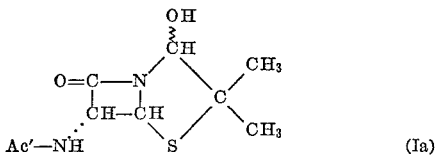

(Ia)

(configuration of 6-amino-penicillanic acid) wherein Ac' represents the acyl radical occurring in pharmacologically active N-acyl derivatives of 6-amino-penicillanic acid or 7-amino-cephalosporanic acid, such as, for example, the radical of the formula Y—$C_mH_{2m}$)—CO—, wherein $m$ represents an integer from 0 to 4, preferably 1, and a carbon atom of a preferably unbranched alkylene radical of formula —($C_mH_{2m}$)— can optionally be substituted by an optionally substituted amino group, a free, etherified or esterified hydroxyl or mercapto group or a free or functionally modified carboxyl group, for example, by one of the abovementioned groups of this kind, and wherein Y stands for an aromatic or cycloaliphatic hydrocarbon radical or heterocyclic radical, the latter preferably of aromatic character, optionally substituted in the nucleus, for example, by the substituents of the above alkylene radical, as well as by sulfo or nitro groups, or for a hydroxyl or mercapto group which is etherified by an aromatic or cycloaliphatic hydrocarbon radical or by a heterocyclic radical, the latter preferably of aromatic character, for example, a 2,6-dimethoxybenzoyl, tetrahydronaphthoyl, 2 - methoxy - naphthoyl, 2 - ethoxynaphthoyl, phenylacetyl, phenyloxyacetyl, phenylthioacetyl, bromophenylthioacetyl, 2-phenyloxypropionyl, α-phenyloxyphenylacetyl, α-methoxy-phenylacetyl, α - methoxy-3,4-dichlorophenylacetyl, α-cyano - phenylacetyl, phenylglycyl (optionally having a protected amino group), benzyloxycarbonyl, benzylthioacetyl, benzylthiopropionyl, hexahydrobenzyloxycarbonyl, cyclopentanoyl, α-aminocyclopentanoyl or α - amino-cyclohexanoyl (optionally having a protected amino group), 2-thienylacetyl, α-cyano-2-thienylacetyl, α-amino - 2 - thienylacetyl (optionally having a protected amino group), 3-thienylacetyl, 2-furylacetyl, 2-phenyl-5-methylisoxazolyl-carbonyl or 2-(2-chlorophenyl) - 5 - methyl-isoxazolylcarbonyl group, or represents a radical of one of the formulae $C_nH_{2n+1}CO$— and $C_nH_{2n-1}CO$—, wherein $n$ represents an integer up to 7, and the chain can be straight or branched and optionally interrupted by an oxygen or sulfur atom and/or substituted, for example, by halogen atoms, trifluoromethyl, free or functionally modified carboxyl, such as cyano, free or substituted amino or nitro groups, for example, a propionyl, butyryl, hexanoyl, octanoyl, butylthio-acetyl, acrylyl, crotonyl, 2-pentenoyl, allylthio-acetyl, chloroacetyl, 3-chloropropionyl, 3-bromopropionyl, aminoacetyl, 2-carboxypropionyl, cyanoacetyl or 2-cyano-3-dimethyl-acrylyl group, or represents a radical of the formula Z—NH—CO—, wherein Z denotes an aromatic or aliphatic hydrocarbon radical which is optionally substituted, especially a lower alkyl radical substituted by lower alkoxy groups and/or halogen atoms, and primarily a monocyclic arylacetyl or aryloxyacetyl or a lower alkanoyl or alkenoyl radical, e.g. phenylacetyl, 4-hydroxy-phenylacetyl, phenyloxyacetyl, hexanoyl, heptanoyl or 2-hexenoyl radical, or represents an easily removable acyl radical, especially the radical of a half-ester of carbonic acid, such as a carbo-lower alkoxy, for example, carbo - tert. - butyloxy or carbo-tert.-pentyloxy radical, a carbo-cycloalkoxy, for example, carbo-adamantyloxy radical, a carbo-phenyl-lower alkoxy, for example, carbo-diphenylmethoxy radical, or a carbo-furyl-lower alkoxy, for example, carbo-furfuryloxy radical.

The new compounds are obtained, when in a compound of the formula

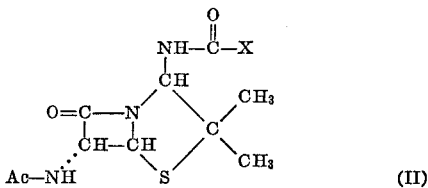

(II)

(configuration of 6-amino-penicillanic acid), in which X is a substituted hydroxy or mercapto group capable of being split under neutral or weak acidic conditions, the group X is split under neutral or weak acidic conditions in the presence of water, and, if desired, in a resulting compound the free hydroxyl group in the 2-position is acylated, and/or, if desired, in a resulting compound having an acylamino grouping with protected functional groups, such groups are liberated and/or, if desired, a resulting isomer mixture is resolved into the individual isomers.

Substituted hydroxy or mercapto groups X capable of being split under neutral or weak acidic conditions form together with the carbonyl grouping protected carboxyl groups which are easily split under these conditions, such as they are known from the amino acid-peptide- and 6-amino-penicillanic acid - 7 - amino-cephalosporanic acid-chemistry.

Preferably the group X represents the residue of the formula —O—$R_0$, in which $R_0$ is a 2-halogeno-lower alkyl radical. It may contain one, two or more halogen, i.e. chlorine, bromine or iodine atoms, with 2-chloro- and 2-bromo-lower alkyl radicals containing several, preferably three chlorine and bromine atoms, respectively, whereas a 2-iodo-lower alkyl radical may have only one iodine atom. The radical $R_0$ especially represents a 2-polychloro-lower alkyl, such as a 2-polychloroethyl, primarily the 2,2,2-trichloroethyl, as well as the 2,2,2-trichloro-1-methyl-ethyl radical, but can also, for example, denote a 2-polybromo-lower alkyl, such as 2,2,2-tribromoethyl, or a 2-iodo-lower alkyl radical, for example, the 2-iodoethyl radical.

The splitting of the group X depends on the nature of such group and is carried out in a known manner, the reaction being performed in the presence of at least one mole, usually of an excess of water.

Thus, the preferred group of the formula —O—$R_0$ may be split by treatment with a chemical reducing agent in the presence of water, the reaction being performed under mild conditions, in most cases at room temperature or even with cooling.

Chemical reducing agents are primarily suitable reducing metals, as well as reducing metal compounds, e.g. metal alloys or metal amalgams, as well as strongly reducing metal salts. Particularly useful are zinc, zinc alloys, e.g. zinc-copper or zinc amalgam, furthermore magnesium, which reagents are advantageously used in the presence of hydrogen-furnishing compounds capable of producing nascent hydrogen together with the metals, metal alloys and metal amalgams, zinc, for example, in the presence of acids, such as organic carboxylic, e.g. lower alkane carboxylic acids, above all acetic acid, with the addition of water, as well as in the presence of aqueous alcohols, such as lower alkanols, e.g. methanol, ethanol or isopropanol, which may be used together with an organic carboxylic acid, and alkali metal amalgams, such as sodium or potassium amalgam, as well as aluminum amalgam in the presence of moist solvents, such as ethers or lower alkanols. Strongly reducing metal salts are primarily chromium-II compounds, for example, chromium-II-chloride or chromium-II-acetate, which are used in the presence of aqueous media, containing organic solvents miscible with water, such as lower alkanols, lower alkanecarboxylic acids or ethers, for example, methanol, ethanol, acetic acid, tetrahydrofuran, dioxane, ethylene glycol dimethyl ether or diethylene glycol dimethyl ether.

If desired, the hydroxyl group in the 2-position in a compound obtainable in accordance with the process can be acylated in a manner which is in itself known. The usual acylating agents, such as acids or their reactive derivatives are used for this purpose, the former, for example, in the presence of a suitable condensation agent, such as a carbodiimide, for example, dicyclohexylcarbodiimide, and the latter, if necessary, in the presence of a basic reagent, such as an organic tertiary base, for example, triethylamine or pyridine. Reactive derivatives of acids are anhydrides, including internal anhydrides, such as ketenes, isocyanates or isothiocyanates, or mixed anhydrides, especially anhydrides which can be manufactured with halogenoformic acid esters, for example, chloroformic acid ethyl ester, and furthermore halides, primarily chlorides, or reactive esters, such as esters of acids with alcohols or phenols containing electron-attracting groupings, as well as with N-hydroxy compounds, for example, cyanomethanol, p-nitrophenol or N-hydroxy-succinimide. The acylation reaction can be performed in the presence or absence of solvents or solvent mixtures, if necessary, with cooling or warming, in a closed vessel under pressure and/or in an inert gas atmosphere, for example, nitrogen atmosphere.

Starting materials of the Formula II, in which Ac may also be hydrogen, are new and represent a further object of the present invention; this particularly relates to the compounds of the Formula II, in which X represents the group of the formula —O—$R_0$ and particularly the compounds of the formula

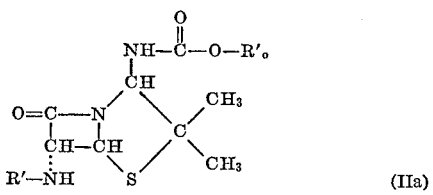

(IIa)

(configuration of 6-amino-penicillanic acid), in which R' is hydrogen or the residue Ac' and $R_0'$ represents a 2-polychloroethyl, as well as a 2-polybromoethyl or 2-iodoethyl radical and primarily the 2,2,2-tirchloroethyl radical.

Preferably, these starting materials can be manufactured by using 2-isocyanato-3,3-dimethyl-6-N-$Ac_0$-amino-4-thia-1-azabicyclo[3.2.0]heptan-7-one compounds (configuration of 6-amino-penicillanic acid) of the formula

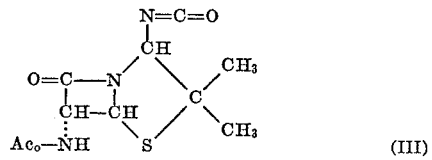

(III)

wherein $Ac_0$ has the significance of an acyl radical Ac, in which free functional groups which are optionally present are protected, above all by treating a compound of the Formula III with a 2-halogeno-lower alkanol of the Formula $R_0$—OH, and, if desired, converting in a resulting compound with a 2-monochloro- or 2-monobromo-lower alkyl group $R_0$ such group into a 2-iodo-lower alkyl group $R_0$, and/or, if desired, converting in a resulting compound having an acyl radical $Ac_0$ with protected functional groups such groups into free functional group, and/or, if desired, splitting an acylamino group in a resulting compound and reacylating the free amino group and/or, if desired, resolving a resulting isomer mixture into the individual isomers.

In the above intermediate product free functional groups in the acyl radical $Ac_0$, which have to be protected during the reaction, for example, in a manner which is in itself known, are primarily free hydroxyl, mercapto and amino groups as well as carboxyl groups. The latter can, for example, be protected by conversion into an ester, for example, an ester which is easily split under acid conditions, such as a methyl ester which is polysubstituted by optionally substituted aliphatic or aromatic hydrocarbon radicals, such as the tert.-butyl ester, or an ester which is easily split by reduction, such as a 2-halogeno-lower alkyl ester, especially the 2,2,2-trichloroethyl ester, whereas the former can, for example, be protected by conversion into an easily splittable acyl derivative, such as a carbo-lower alkoxy derivative, which can be split under acid conditions, e.g. one in which the lower alkyl radical in the α-position is preferably branched or substituted by optionally substituted aromatic hydrocarbon radicals, for example, the carbo-tert.-butyloxy derivative, or into a carbo-2-halogeno-lower alkoxy derivatives, which is easily split by reduction, such as a carbo-2,2,2-trichloroethoxy derivatives.

The reaction with a suitable 2-halogeno-lower alkanol, especially a 2-halogenoethanol, for example, 2,2,2-trichloethanol, is optionally carried out in an inert solvent, for example, in a halogenated hydrocarbon, such as carbon tetrachloride, chloroform or methylene chloride or in an aromatic solvent, such as benzene, toluene or chlorobenzene, preferably with warming.

In this reaction it is possible to start from precursors of compounds of the Formula III, form the latter under the reaction conditions and thus to obtain the desired starting materials directly. If, for example, an appropriate 3,3-dimethyl-6-N-$Ac_0$-amino-7-oxo-4-thia-1-aza-2-bicyclo[3.2.0]heptane-carboxylic acid azide (configuration of 6-amino-penicillanic acid), which can, for example, be obtained by converting a 3,3-dimethyl-6-N-$Ac_0$-amino-7-oxo-4-thia-1-aza-2-bicyclo[3.2.0]heptane-carboxylic acid (configuration of 6-amino-penicillanic acid), for example, a 6-N-$Ac_0$-amino-penicillanic acid, or a suitable salt, especially an ammonium salt thereof, into a mixed anhydride (for example, by treatment with a halogenoformic acid lower alkyl ester, such as chloroformic acid ethyl ester, in the presence of a basic reagent, such as triethylamine) and treating the latter with a metal azide, such as sodium azide, or an ammonium azide, for example, benzyltrimethylammonium azide, is used, this azide, in the absence or presence of the 2-halogeno-lower alkanol, decomposes with the evolution of nitrogen under the reaction conditions, for example, on warming, to give the desired isocyanato compound of the Formula III, which usually does not have to be isolated and which in the presence of the 2-halogeno-lower alkanol is directly converted to the desired starting material.

In a compound resulting from the above procedure the chlorine or bromine atom in a 2-monochloro- and 2-monobromo-lower alkyl radical, respectively, may be exchanged for an iodine atom, for example, by treatment with a suitable iodine salt, such as an alkali metal iodide, e.g. potassium iodide, in the presence of a suitable solvent, e.g. acetone.

In a starting material obtainable in accordance with the above process as acyl radical may be removed according to known methods, for example, by treatment with a halogenating reagent, e.g. phosphorus pentachloride, reaction of the resulting imide chloride with an alcohol, such as a lower alkanol, and splitting of the imino ether, preferably under acidic conditions. An acyl radical of a suitable half-ester of carbonic acid, such as a carbo-lower alkoxy radical which can be split under acid conditions, for example, the carbo-adamantyloxy or carbo-diphenylmethoxy radical may be removed, for example, by treatment with trifluoracetic acid. In a similar manner, protected functional groups in an acyl radical in a resulting starting material can be converted to the corresponding free groups.

In a resulting starting material with a free amino group the latter can be acylated according to methods which are in themselves known, for example, like a free hydroxyl group in the manner described above, i.e. by treatment with a free carboxylic acid or especially a reactive functionally modified carboxylic acid, for example, with an acid chloride or acid anhydride, optionally in the presence of a condensing reagent.

The compounds of the present invention are useful as starting materials for the manufacture of other compounds, which are either useful as pharmacologically active compounds or as intermediate products.

Thus, they can, for example, be used for the manufacture of 1-formyl-2α-(2-$R_1$-carbonyloxy - 2 - propylmercapto)-3α-(N-Ac-amino)azetidin-4-one compounds of the formula

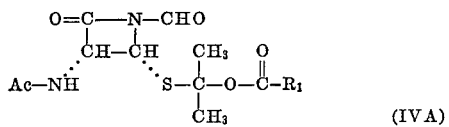

(IVA)

in which $R_1$ represents an organic radical.

An organic radical $R_1$ is, for example, an optionally substituted hydrocarbon radical, such as one of the abovementioned radicals of this nature, primarily an optionally substituted aliphatic or aromatic hydrocarbon radical, such as one of the abovementioned corresponding radicals, especially a lower alkyl radical, such as a methyl radical, or a monocyclic aromatic hydrocarbon radical, especially a phenyl radical which is optionally substituted, for example, as mentioned above.

The compounds of the above nature may be present in the form of mixtures of isomers or of pure isomers.

These compounds show valuable pharmacological properties; in particular, they are active against gram-positive bacteria, such as *Staphylococcus aureus* in dilutions ranging to 0.01%, and can, therefore, be used as antibacterial active substances. They also serve as intermediate products for the manufacture of valuable compounds, for example, pharmacologically active compounds.

Particularly valuable compounds are those of the formula

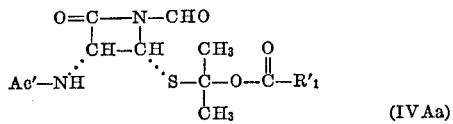

(IVAa)

in which $R_1'$ represents a lower alkyl radical, especially the methyl radical, as well as a phenyl radical optionally substituted by lower alkyl or lower alkoxy groups or halogen atoms.

The above compounds are obtained, when a 2-hydroxy-3,3 - dimethyl - 6 - N - $Ac_0$ - amino - 4 - thia - 1 azabicyclo[3.2.0]heptan-7-one compound (configuration of 6-amino-penicillanic acid) of the formula

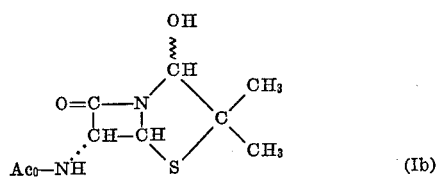

(Ib)

is treated with an oxidising reagent furnishing an acyloxy group of the formula —O—C(=O)—$R_1$, and, if desired, in a resulting compound having a radical $Ac_0$ with protected functional groups, such groups are liberated and/or, if desired, a resulting isomer mixture is resolved into the individual isomers.

Oxidizing reagents, furnishing acyloxy groups of the formula —O—C(=O)—$R_1$ are preferably oxidizing heavy metal carboxylates, preferably lead-IV-carboxylates, such as lead-IV-alkylcarboxylates, especially lead-IV-lower alkylcarboxylates and primarily lead-tetraacetate, also lead tetrapropionate or lead tetrastearate, as well as optionally substituted lead tetrabenzoates, for example, lead tetrabenzoate or lead tetra-3-bromobenzoate, also thallium-III-carboxylates, for example, thallium-III-acetate, or mercury-II-carboxylates, such as mercury-II-acetate. If desired, these oxidizing agents can be formed in situ, for example, by reacting lead dioxide or mercury-II-oxide with an organic carboxylic acid, such as acetic acid. At least an equivalent amount of the oxidizing reagent is used; normally an excess thereof is employed.

The above heavy metal carboxylates, especially the corresponding lead-IV compounds, are advantageously used in the presence of a source of light, the process preferably being carried out under ultra-violet light, as well as light of longer wavelengths, such as visible light, optionally with the addition of suitable sensitisers. Ultra-violet light has preferably a main wavelength range of above 280 mμ, primarily of about 300 mμ to about 350 mμ; this can, for example, be achieved by suitably filtering the ultra-violet light through an appropriate filter, for example, a glass filter, or through suitable solutions, such as salt solutions, or other liquids which absorb light of shorter wavelengths, such as benzene or toluene. The ultraviolet light is preferably generated by means of a high pressure mercury vapour lamp.

The above reaction can, for example, be carried out by treating a starting material of the Formula Ib with the necessary quantity of the oxidizing agent capable of furnishing an acyloxy group of the formula

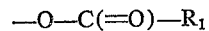

usually in the presence of a suitable diluent, such as benzene acetonitrile or acetic acid, if necessary, while cooling or warming and/or in an inert gas atmosphere, while irradiating with ultra-violet light.

In a resulting compound, protected, functional groups in an acyl radical $Ac_0$ can be liberated in a known manner e.g. as mentioned above.

Furthermore, the compounds of the Formula I can also be used for the manufacture of 2α-(2-hydroxymethyl-2-propyl-mercapto)-3α-N-R-amino-azetidin - 2 - one compounds of the formula

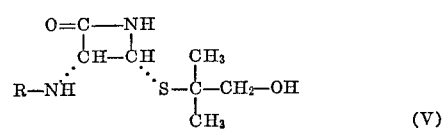

(V)

in which R is hydrogen or an acyl radical Ac, as well as of O-esters of such compounds.

O-esters of compounds of Formula V are primarily those with organic carboxylic acids, such as the abovementioned optionally substituted aliphatic, cycloaliphatic, cycloaliphatic-aliphatic, aromatic, araliphatic, heterocyclic or heterocyclic-aliphatic carboxylic acids, as well as with semi-derivatives of carbonic acid, also those with organic sulfonic acids, as well as with inorganic acids such as hydrohalic acids, for example, hydrogen chloride or hydrogen bromide.

Compounds of the above nature, in which R represents the acyl radical Ac, with free functional groups optionally present in the residue Ac preferably being protected, represent valuable intermediate products. Compounds which are particularly valuable as intermediate products are those of the formula

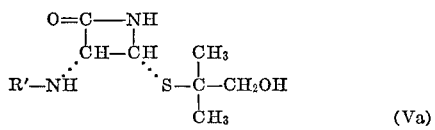

in which R' stands for hydrogen or an acyl radical Ac'', the latter having the same meaning as Ac' and also representing a carbo-lower alkoxy group, in which the lower alkyl portion is substituted by halogen, e.g. chlorine atoms, preferably in β-position, e.g. the carbo-2,2,2-trichloroethoxy group, and O-esters thereof with lower alkanecarboxylic acids.

The above compounds of Formula V can be obtained by treating a 2 - hydroxy - 3,3 - dimethyl - 6 - N - Ac-amino - 4 - thia - 1 - azabicyclo[3.2.0]heptan - 7 - one compound of Formula I with a hydride reducing agent which is inert towards amide groupings and, if desired, esterifying the hydroxyl group in a resulting compound and/or, if desired, splitting an acylamino grouping in a resulting compound, and, if desired, acylating the liberated amino group, and/or, if desired, liberating in a resulting compound having an acyl radical with protected functional groups, such groups, and/or, if desired, resolving a resulting isomer mixture into the individual isomers.

Hydride reducing reagents which do not reduce an amide grouping are primarily hydrides containing boron, such as, for example, diborane and especially alkali metal or alkaline earth metal borohydrides, above all sodium borohydride. Complex organic aluminum hydrides, such as alkali metal tri-lower alkoxy-aluminum hydrides, for example, lithium - tri - tert. - butyloxy - aluminum hydride, can also be used.

These reducing agents are preferably used in the presence of suitable solvents or mixtures thereof, alkali metal borohydride, for example, in the presence of solvents possessing hydroxyl or ether groupings, such as lower alkanols, for example, methanol or ethanol, as well as isopropanol, furthermore tetrahydrofuran or diethylene glycol dimethyl ether, with cooling or warming, if necessary.

In a resulting compound it is possible according to known methods, for example, those described above, to esterify the free hydroxyl group and/or split an acyl-amino group and, if desired, to acylate it again; protected functional groups can be liberated e.g. in the manner mentioned. The conversion of the free hydroxyl group into a hydroxyl group esterified by an inorganic acid, especially hydrogen halide acid, can be performed in a manner which is in itself known, for example, by treatment with the usual halogenating agents, such as halides of sulfur and of phosphorus, for example, thionyl chloride or phosphorus oxychloride.

As has been mentioned, the compounds of Formula V are useful as intermediate products. Thus, they can inter alia be employed for the manufacture of compounds of the formula

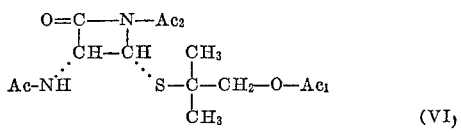

in which each of the groups Ac₁ and Ac₂ denotes the acyl radical of an organic carboxylic acid, especially of compounds of the formula

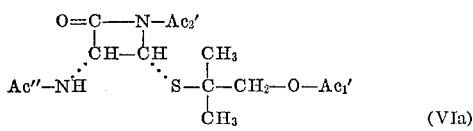

wherein each of the radicals Ac₁' and Ac₂' represents a lower alkanoyl radical. These compounds are active against gram-positive bacteria, especially against *Staphylococcus aureus*, and are, therefore, useful as antibacterially active compounds.

They are obtained, when compounds of Formula V, wherein R represents an acyl radical Ac, in which free functional groups optionally present may be protected, or O-esters thereof with carboxylic acids, are acylated at an elevated temperature. Organic carboxylic acids, but primarily their reactive functional derivatives, such as those described above, especially anhydrides or halides, e.g. chlorides, are used as acylating agents, and the process is preferably carried out at temperatures of about 40° C. to about 150° C., especially within a temperature range of about 60° C. to about 120° C., and, if necessary, in the presence of a condensing reagent which is suitable for acylation purposes, a free carboxylic acid, for example, in the presence of a carbodiimide, such as dicyclohexylcarbodiimide, and a reactive functional derivative of an organic carboxylic acid in the presence of an organic base, especially a tertiary base, such as pyridine.

Furthermore, compounds of Formula V, in which R represents the acyl radical Ac₀, and their O-esters, especially those with organic carboxylic acids, as well as carbonic acid semi-derivatives, can be converted to compounds of the formula

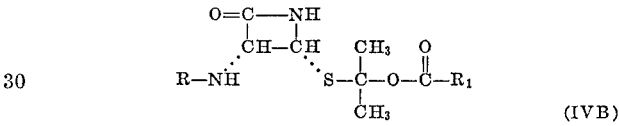

by treatment with oxidizing agents capable of furnishing an acyloxy group of the formula —O—C(=O)—R₁ and, if desired, after liberating optionally protected functional groups in the acyl radical Ac₀ and/or splitting of the acylamino grouping and optionally acylating the amino group. Compounds of this type are, like those of Formula IVa, active against gram-positive bacteria such as *Staphylococcus aureus* in dilutions ranging to 0.01% and are accordingly useful as antibacterially active substances. They are, furthermore, suitable as intermediate products for the manufacture of valuable compounds, for example, compounds which can be used pharmacologically or as intermediate products.

Particularly valuable compounds, primarily as intermediates, are those of the formula

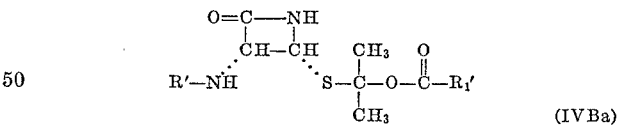

in which R' and R₁' have the above given meaning.

In the manufacture of compounds of the Formula IVB from those of the Formula V, the previously mentioned oxidizing heavy metal carboxylates, especially lead-IV-alkanoates and particularly lead tetraacetate, are primarily used as oxidizing agents capable of furnishing an acyloxy group, with the process advantageously being carried out, as mentioned, with at least an equivalent amount, usually an excess of the oxidizing reagent and and in the presence of a source of light, primarily of ultraviolet light, and of a suitable solvent or diluent Compounds of Formulae IV–A and IV–B represent, as mentioned, compounds which are suitable for the manufacture of pharmacologically active compounds or of compounds which are useful as intermediates, especially of 1 - R₂ - 2α - isopropenylmercapto - 3α - Ac - amino-azetidin-4-one compounds of the formula

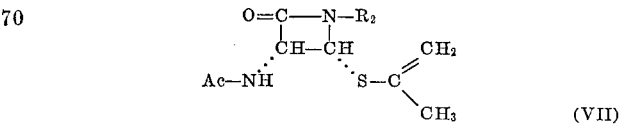

wherein R₂ represents a hydrogen atom or a formyl group.

The compounds of the above type may be present in the form of mixtures of isomers or of pure isomers.

Compounds of Formula VII show valuable pharmacological properties; in particular they are active against gram-positive bacteria, such as *Staphylococcus aureus* in dilutions ranging to 0.01% and are, therefore, useful as antibacterially active substances. They primarily serve as intermediates for the manufacture of valuable compounds, for example, pharmacologically active compounds.

Particularly valuable compounds are those of the formula

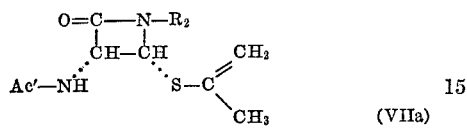

(VIIa)

wherein Ac' has the significance given above.

The compounds of Formula VII can be obtained, when compounds of the formula

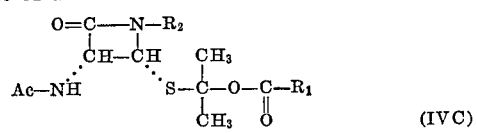

(IVC)

are thermally decomposed and, if desired, in a resulting compound a formyl group $R_2$ is split off, and/or, if desired, in a resulting compound having an acyl radical with protected functional groups, these groups are liberated and/or, if desired, a resulting isomer mixture is resolved into the individual isomers.

The thermal decomposition of the starting material is preferably performed in the presence of an inert solvent or solvent mixture, especially a suitable hydrocarbon, such as an aliphatic or aromatic hydrocarbon, for example, high-boiling petroleum ether, benzene, toluene or xylene, and at temperatures of about 50° C. to about 150° C., preferably from about 70° C. to about 120° C., if desired, in an inert gas, such as a nitrogen atmosphere.

In a resulting compound of Formula VII, in which $R_2$ represents the formyl radical, the latter can be replaced by hydrogen by hydrolysis, alcoholysis, ammonolysis or aminolysis, as well as by treatment with a specific decarbonylation reagent. Hydrolysis can, for example, be performed in an aqueous medium by treatment with a suitable inorganic base, such as an alkali metal or alkaline earth metal hydroxide or carbonate, for example, sodium, potassium, calcium or barium hydroxide or carbonate, as well as an alkali metal hydrogen carbonate, for example, sodium or potassium hydrogen carbonate. The alcoholysis with alcohols, such as lower alkanols, for example, methanol or ethanol, as well as with mercaptans, is preferably caired out in the presence of appropriate alcoholates or thiolates, such as alkali metal lower alkanolates, for example, sodium methylate or ethylate, as well as of weakly basic acylates, such as alkali metal lower alkanoates, for example, sodium acetate.

The ammonolysis with ammonia, as well as with quaternary ammonium hydroxides, for example, benzyltrimethylammonium hydroxide or tetrabutylammonium hydroxide, also leads to the removal of a formyl group $R_2$. When using ammonia the process is, for example, carried out in a two-phase system; the ammonia, which is preferably used in the form of an aqueous solution, passes then into the organic phase at a low concentration and effects the splitting-off of the formyl group. Aminolysis can be carried out with amines, especially primary or secondary, primarily aliphatic or aromatic, amines, for example, ethylamine, diethylamine, pyrrolidine or aniline.

Specific decarbonylation reagents are, for example, complex transition metal compounds which can form a stable complex together with carbon monoxide, such as tri-substituted tris-phosphine-rhodium halides, for example, tris-(triphenyl)-phosphine-rhodium chloride. They are preferably used in a suitable inert solvent, for example, benzene, or a solvent mixture, if desired, in an inert gas, for example, nitrogen atmosphere.

The removal of the formyl group, which, for example, when using a decarbonylation reagent is preferably carried out at an elevated temperature, can also be directly carried out on the starting material of Formula IVa; under these conditions the thermal decomposition occurs with the formation of the isopropenyl radical and the formyl group is silmultaneously replaced by hydrogen.

Compounds which can be manufactured using compounds of Formula VII as starting substances are, for example, those of the formula

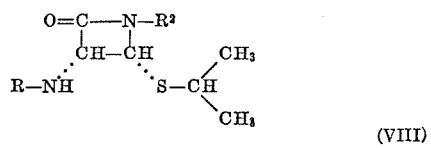

(VIII)

especially of the formula

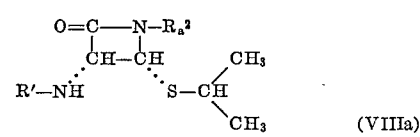

(VIIIa)

wherein $R^2$ represents a hydrogen atom or the acyl radical $Ac_2$ of an organic carboxylic acid, especially of one of the abovementioned optionally substituted aliphatic, cycloaliphatic, cycloaliphatic-aliphatic, aromatic, araliphatic, heterocyclic or heterocyclic-aliphatic carboxylic acids, as well as the acyl radical of a carbonic acid semi-derivative, and $R_a^2$ represents a hydrogen atom or the acyl radical $Ac_2'$ of a lower alkanecarboxylic acid, including formic acid.

Compounds of the above nature, especially those in which R and $R^2$ or R' and $R_a^2$ represent acyl groups, show valuable pharmacological properties; in particular, they are active against gram-positive bacteria, such as *Staphylococcus aureus* in dilutions ranging to 0.01% and are, therefore, useful accordingly. They can also serve as intermediate products, such as for the manufacture of valuable compounds, for example, pharmacologically active compounds.

They can be obtained, when the isopropenyl group is saturated in compounds of Formula VII and, if desired, in a resulting compound the formyl group is split off and/or, if desired, in a resulting compound the nitrogen atom of the lactam grouping carrying the hydrogen atom is acylated and/or, if desired, in a resulting compound an acylamino grouping is split and, if desired, the liberated amino group is acylated and/or, if desired, in a resulting compound having an acyl radical with protected functional groups these groups are liberated and/or, if desired, a resulting isomer mixture is resolved into the individual isomers.

The reduction of the isopropenyl radical in the starting material of Formula VII is preferably performed by treatment with catalytically activated hydrogen, for example, with hydrogen in the presence of a nobel metal catalyst which, for example, contains palladium or platinum, if necessary, at elevated pressure and/or with heating.

A formyl group $R_2$ can be replaced by hydrogen, for example, according to the method described above, while in a resulting compound it is possible, if desired, to split a suitable acylamino grouping in the manner mentioned above, and, if desired, to acylate a free amino group formed in this way; protected functional groups can be liberated, for example, as mentioned above.

Compounds of Formula VII, primarily those in which Ac represents an acyl radical $Ac^0$ which is easily removable, especially under acid conditions, such as a suitable acyl radical of a carbonic acid half-ester, such as a carbo-lower alkoxy radical, which is optionally substituted in the lower alkyl portion, preferably in the α- position, as well as a carbo-lower alkenyloxy, carbo-cycloalkoxy, carbo-phenyloxy or carbo-phenyl-lower alkoxy radical which is optionally substituted in the lower alkenyl, cycloalkyl, phenyl and phenyl-lower alkyl portion, respectively, or a carbo-lower alkoxy radical having a heterocyclic group of aromatic character in the lower alkyl portion, preferably in the α-position, and $R_2$ denotes a hydrogen atom, can furthermore be converted to compounds of the formula

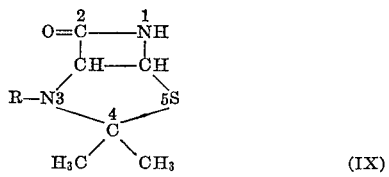

(IX)

especially to those compounds, in which R has the significance of R'; compounds of this type are known, for example, as valuable intermediate products in the synthetic manufacture of 7-acylamino-cephalosporanic acid compounds; see, for example, Austrian Pat. No. 263,768 and 264,537.

They are obtained, when compounds of Formula VII, wherein Ac preferably represents one of the abovementioned easily removable radicals $Ac^0$, are treated with a strong oxygen-containing acid, and, if desired, in a resulting compound of Formula IX having an unsubstituted nitrogen atom in the 3-position, the latter is acylated.

The ring closure can be effected by treatment with a strong inorganic or organic oxygen-containing acid, such as organic carboxylic or sulfonic acids, especially a strong lower alkanecarboxylic acid, which is optionally substituted by hetero-radicals, preferably by halogen atoms, such as an α-halogeno-acetic or α-halogenopropionic acid, wherein halogen preferably denotes fluorine, as well as chlorine, primarily trifluoroacetic acid. The reaction is carried out in the absence or presence of an inert solvent, such as dioxane, or of a mixture of diluents and, if necessary, with cooling, for example, at temperatures of about —30° to about +10° C., and/or in an inert gas, for example, nitrogen atmosphere.

Acylation of a hydrogen-containing nitrogen atom in a resulting compound can, for example, be carried out as described above, if desired, in stages.

Mixtures of isomers obtainable according to the above processes can be resolved into the individual isomers according to methods which are in themselves known, for example, by fractional crystallization, adsorption chromatography (column or thin layer chromatography) or other suitable resolution processes. Resulting racemates having salt-forming groups, into which, in view of the racemate solution, suitable substituents can temporarily be introduced in the usual manner, can be resolved into the antipodes in the usual manner, can be resolved into ing a mixture of diastereo-isomeric salts with optically active salt-forming reagents, resolving the mixture into the disastero-isomeric salts and converting the separated salts into the free compounds, or by fractional crystallization from optically active solvents.

The above processes also comprise those modifications according to which compounds formed as intermediates are used as starting materials and the remaining process stages are carried out with these or the process is interrupted at any stage; furthermore, starting materials can be used in the form of derivatives, for example, of salts, or can be formed during the reaction.

The invention also comprises new intermediate products, as well as processes for their manufacture.

Preferably, those starting materials are used and the reaction conditions are so chosen that the compounds mentioned above as being preferred are obtained.

The compounds of the present invention having pharmacological effect can, for example, be used in the form of pharmaceutical preparations in which they are in admixture with a solid or liquid pharmaceutical excipient and which are suitable for enteral or parenteral administration. Suitable excipients, which are inert towards the active substances, are, for example, water, gelatine, saccharides, such as lactose, glucose or sucrose, starches, such as corn starch, wheat starch or arrowroot, stearic acid or salts thereof, such as magnesium or calcium stearate, talc, vegetable fats and oils, alginic acid, benzyl alcohols, glycols or other known excipients. The preparations may be in solid form, for example, as tablets, dragees, capsules or suppositories, or in a liquid form, for example, as solutions, suspensions or emulsions. They can be sterilized and/or contain auxiliary substances such as preservatives, stabilizers, wetting agents or emulsifiers, solubilizing agents, salts for regulating the osmotic pressure and/or buffers. They can, furthermore, contain other pharmacologically usable substances. The pharmaceutical preparations, which are also comprised by the present invention, can be formulated in a manner which is in itself known.

The invention is described in the following examples; temperatures are given in degrees centigrade.

A solution of 3 g. of crystalline 2-(N-carbo-2,2,2-trichloroethoxy - amino) - 3,3 - dimethyl - 6 - (N-phenyloxyacetylamino) - 4 - thia - 1 - azabicyclo[3.2.0]heptan-7-one in 65 ml. of 90% aqueous acetic acid and 30 ml. of dimethylformamide is mixed with 32.6 g. of zinc dust over the course of 20 minutes while cooling with ice, and is stirred for 20 minutes. The excess zinc is filtered off and the filter residue is washed with benzene; the filtrate is dilulted with 450 ml. of benzene, washed with a saturated aqueous sodium chloride solution and with water, dried and evaporated under reduced pressure. The residue is purified on a column of 45 g. of acid-washed silica gel. Elution is carried out with 100 ml. of benzene and 400 ml. of a 9:1-mixture of benzene and ethyl acetate and apolar products are obtained. Starting material is eluted with 100 ml. of a 4:1-mixture of benzene and ethyl acetate, and with a further 500 ml. of the 4:1-mixture of benzene and ethyl acetate and with 200 ml. of a 2:1-mixture of benzene and ethyl acetate 2-hydroxy-3,3 - dimethyl - 6 - (N - phenyloxyacetyl - amino)-4-thia-1-azabicyclo[3.2.0]heptan-7-one (configuration of 6-amino-penicillanic acid) of the formula

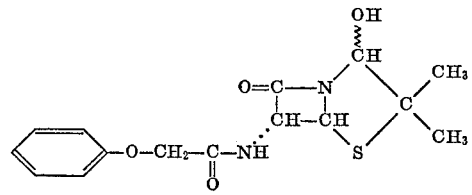

is obtained; this crystallizes spontaneously as the hydrate and after trituration with ether, saturated with water, melts in an unsharp manner in the range of 62–85°.

If chromatographed but non-crystalline starting material is used and the reduction is carried out in dilute acetic acid without the addition of dimethylformamide, the pure product, M.P. 62–70°, is obtained; thin layer chromatogram (silica gel): Rf=0.35 in a 1:1-mixture of benzene and ethyl acetate; infra-red absorption spectrum (in methylene chloride): characteristic bands at 2.93μ, 3.09μ, 5.65μ, 5.96μ, 6.29μ, 6.65μ, 6.75μ, 8.57μ, 9.27μ, 10.00μ and 11.95μ.

EXAMPLE 2

A solution of 2.49 g. of 2-(N-carbo-2,2,2-trichloroethoxy - amino) - 3,3-dimethyl-6-(N-phenylacetyl-amino)-4-thia-1-azabicyclo[3.2.0]heptan-7-one in 50 ml. of dimethylformamide, 25 ml. of acetic acid and 5 ml. of water is prepared at room temperature, and is then cooled to 0° and mixed with a total of 25 g. of zinc dust over the course of 10 minutes while stirring. The mixture is left for 20 minutes at 0°, and is then filtered into a receiver containing 500 ml. of a saturated aqueous sodium chloride solution, and the filter residue is washed with 25 ml. of acetic acid. The filtrate is extracted three times with 300 ml. of benzene at a time; the organic extracts are washed with water, a dilute aqueous sodium hydrogen carbonate solution and water, combined, dried and evaporated under reduced pressure. The residue is chromatographed on 45 g. of acid-washed silica gel. Fractions of 100 ml. each are taken, elution being carried out with 300 ml. of benzene, 300 ml. of a 9:1-, 500 ml. of a 4:1-, 600 ml. of a 2:1- and 200 ml. of a 1:1-mixture of benzene and ethyl acetate and 100 ml. of ethyl acetate. Fractions 8 and 9 contain crystalline starting material, while the 2-hydroxy-3,3 - dimethyl - 6 - (N - phenylacetyl - amino)-4-thia-1-azabicyclo[3.2.0]heptan-7-one (configuration of 6-amino-penicillanic acid) of the formula

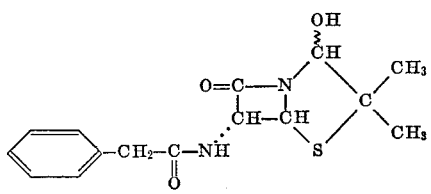

is obtained as a colorless oil from fractions 11–15; infra-red absorption spectrum (in methylene chloride): characteristic bands at 2.90μ, 3.05μ, 5.64μ, 5.99μ, 6.70μ and 9.28μ.

EXAMPLE 3

A solution of 0.5 g. of 2-(N-carbo-2,2,2-trichloroethoxy - amino) - 3,3-dimethyl-6-(N-carbo-tert.-butyloxyamino) - 4 - thia-1-azabicyclo[3.2.0]heptan-7-one (configuration of 6-amino-penicillanic acid) in 5 ml. of tert.-butanol is diluted with 4 ml. of acetic acid and 1 ml. of water. After cooling in an ice bath, 5 g. of zinc dust are added in small portions over the course of 15 minutes while stirring. The mixture is stirred for a further 30 minutes at 0° and is then filtered into a receiver containing 70 ml. of a saturated aqueous sodium chloride solution. The residue is washed with methylene chloride and the aqueous phase of the filtrate is extracted with the same solvent. The organic extracts are washed with a saturated sodium chloride solution, dried and evaporated under reduced pressure. The crude product thus obtained can be purified by chromatography on 10 g. of acid-washed silica gel, a forerun being taken with a 9:1-mixture of benzene and ethyl acetate, and the 2-hydroxy-3,3 - dimethyl -6- (N - carbo - tert.-butyloxy-amino)-4-thia-1-azabicyclo[3.2.0]heptan-7-one (configuration of 6-amino-penicillanic acid) of the formulà

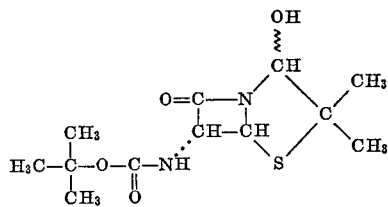

being then eluted as a colorless oil with the same solvent mixture and with a 4:1-mixture of benzene and ethyl acetate. This material crystallizes from a mixture of ether and pentane, M.P. 106–110° (sintering from 100° up); $[\alpha]_D^{20}=115°\pm1°$ (c.=0.858 in chloroform); thin layer chromatogram (silica gel); Rf~0.53 in a 1:1-mixture of benzene and ethyl acetate; infra-red absorption spectrum (in methylene chloride): characteristic bands at 2.91μ, 3.04μ, 5.64μ, 5.84μ, 6.68μ, 7.33μ and 8.60μ.

EXAMPLE 4

A solution of 0.14 g. of 2-hydroxy-3,3-dimethyl-6-(N-phenyloxyacetyl-amino) - 4 - thia - 1 - azabicyclo[3.2.0] heptan-7-one in 2 ml. of dry benzene is mixed with 1 ml. of acetic acid anhydride and 0.2 ml. of pyridine and heated for 2 hours to 50°. It is then evaporated under reduced pressure and the residue is purified by chromatography on 1 g. of acid-washed silica gel. Elution is carried out with 10 ml. of benzene and 40 ml. of a 19:1-mixture of benzene and ethyl acetate and the pure 2 - acetyloxy - 3,3 - dimethyl - 6 - (N - phenyloxyacetyl-amino)-4-thia-1-azabicyclo[3.2.0]heptan-7-one (configuration of 6-amino-penicillanic acid) of the formula

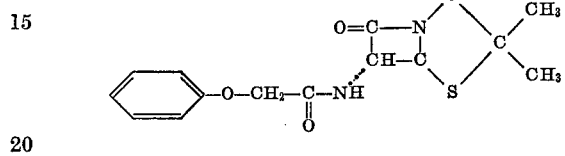

is thus obtained; M.P. 129–131° after crystallization from a mixture of ether and pentane and recrystallization from ether; $[\alpha]_D^{20}=+85°\pm1°$ (c.=1.135 in chloroform); infra-red absorption spectrum (in methylene chloride): characteristic bands at 3.05μ, 5.61μ, 5.74μ, 5.94μ, 6.28μ, 6.64μ, 6.72μ, 8.32μ and 9.62μ.

EXAMPLE 5

A solution of 0.132 g. of 2-hydroxy-3,3-dimethyl-6-(N-phenyloxyacetyl-amino) - 4 - thia - 1 - azabicyclo[3.2.0] heptan-7-one in 2 ml. of benzene is mixed with 0.75 ml. of a 10 ml. solution of 1 ml. of benzoyl chloride in benzene and with 0.1 ml. of pyridine and the mixture is stirred for 20 hours at room temperature, then diluted with benzene and washed with 0.5 N hydrochloric acid, a dilute aqueous sodium hydrogen carbonate solution and water. The aqueous wash solutions are washed back with benzene; the combined benzene solutions are dried and evaporated under reduced pressure. The residue is chromatographed on 2.5 g. of acid-washed silica gel, apolar impurities being eluted with 60 ml. of benzene and the 2-benzoyloxy - 3,3 - dimethyl - 6 - (N-phenyloxyacetyl-amino)-4-thia-1-azabicyclo[3.2.0]heptan-7-one (configuration of 6-amino-penicillanic acid) of the formula

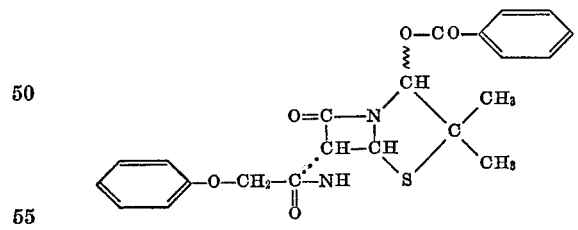

being eluted with 15 ml. of a 9:1-mixture of benzene and ethyl acetate; this material is obtained as a slightly yellowish, amorphous product; infra-red absorption spectrum (in methylene chloride): characteristic bands of 3.05μ, 5.60μ, 5.80μ, 5.92μ, 6.26μ, 6.62μ, 6.70μ, 8.28μ, 8.50μ, 9.20μ, 9.36μ and 10.20μ.

EXAMPLE 6

A solution of 0.14 g. of 2-hydroxy-3-3-dimethyl-6-(N-phenylacetyl-amino)-4-thia - 1 - azabicyclo[3.2.0]heptan-7-one in 2 ml. of anhydrous benzene is mixed with 1 ml. of acetic acid anhydride and 0.2 ml. of pyridine and the mixture is warmed for 2 hours at 50° and then concentrated under reduced pressure. The residue is filtered through a column of 10 g. of acid-washed silica gel; 30 ml. of a 19:1-mixture of benzene and ethyl acetate and 10 ml. of a 9:1-mixture of benzene and ethyl acetate are used to elute the amorphous 2-acetyloxy-3,3-dimethyl-6-(N-phenylacetyl - amino) - 4 - thia - 1 - azabicyclo[3.2.0]

heptan-7-one (configuration of 6-amino-penicillanic acid) of the formula

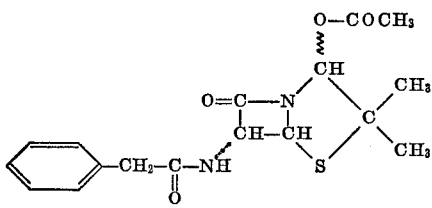

infra-red absorption spectrum (in methylene chloride): characteristic bands at 3.06μ, 5.62μ, 5.76μ, 5.98μ, 6.70μ, 7.35μ, 8.28μ and 9.60μ; the product contains about 10% of the compound which is epimeric in the 2-position.

EXAMPLE 7

A solution of 0.123 g. of 2-hydroxy-3,3-dimethyl-6-(N-phenylacetyl-amino)-4-thia - 1 - azabicyclo[3.2.0]heptan-7-one in 2 ml. of anhydrous benzene is mixed with 0.1 ml. of pyridine and with 0.75 ml. of a 10 ml.-solution of 1 ml. of benzoyl chloride in benzene, and the mixture is stirred for 16 hours at room temperature. It is diluted with benzene and the solution is washed with 0.5 N hydrochloric acid, a dilute aqueous sodium hydrogen carbonate solution and water, and the aqueous solutions are extracted with benzene. The organic solutions are combined, dried and concentrated under reduced pressure. The residue is chromatographed on 2.5 g. of acid-washed silica gel. The 2-benzoyloxy - 3,3 - dimethyl-6-(N-phenylacetyl-amino)-4-thia-1-azabicyclo[3.2.0]heptan-7-one (configuration of 6 amino-penicillanic acid) of the formula

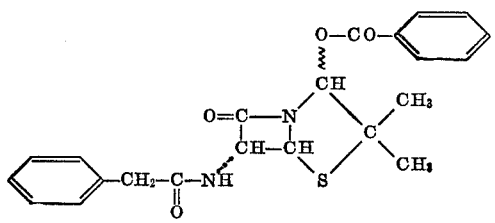

is eluted with a 19:1- and a 9:1-mixture of benzene and ethyl acetate, in the form of a yellow oil; infra-red absorption spectrum (in methylene chloride): characteristics bands at 3.03μ, 5.60μ, 5.80μ, 5.97μ, 6.65μ, 9.18μ, 9.34μ, 9.72μ and 10.15μ.

The starting substances used in the preceding examples can be manufactured as follows:

EXAMPLE 8

A solution of 2.625 g. of penicillin-V in 30 ml. of tetrahydrofuran is mixed with 5.31 ml. of a 10 ml.-solution of 2 ml. of triethylamine in tetrahydrofuran while stirring and cooling to −10°. 3.6 ml. of a 10 ml.-solution of 2 ml. of chloroformic acid ethyl ester in tetrahydrofuran are then added slowly at −10° and after completion of the addition, the mixture is stirred for 90 minutes at −10° to −5°.

The reaction mixture is treated with a solution of 0.51 g. of sodium azide in 5.1 ml. of water, stirred for 30 minutes at 0° to −5° and diluted with 150 ml. of ice water. It is extracted three times with methylene chloride; the organic extracts are washed with water, dried and evaporated at 25° and under reduced pressure. The amorphous penicillin-V azide is thus obtained as a slightly yellowish oil; infrared absorption spectrum (in methylene chloride): characteristic bands at 3.04μ, 4.70μ, 5.61μ, 5.82μ (shoulder), 5.93μ, 6.26μ, 6.61μ, 6.71μ, 8.50μ and 9.40μ.

A solution of 2.468 g. of penicillin-V azide in 30 ml. of benzene is heated to 70° for 30 minutes. The pure 2-isocyanato - 3,3 - dimethyl - 6 - (N - phenyloxyacetyl-amino) - 4 - thia - 1 - azabicyclo[3.2.0]heptan - 7 - one (configuration of 6-amino-penicillanic acid) can be obtained by evaporating the solution under reduced pressure; infra-red absorption spectrum (in methylene chloride): characteristic bands at 3.03μ, 4.46μ, 5.59μ, 5.93μ, 6.26μ, 6.62μ, 6.70μ, 7.53μ, 8.28μ, 8.53μ, 9.24μ and 9.40μ.

The above solution of the 2-isocyanato - 3,3 - dimethyl-6-(N-phenyloxyacetyl-amino) - 4 - thia - 1 - azabicyclo-[3.2.0]heptan-7-one is mixed with 3.4 ml. of a 10 ml. solution of 2 ml. of 2,2,2-trichloroethanol in benzene and the reaction mixture is kept for 95 minutes at 70°. The solvent is removed under reduced pressure and the residue is purified on 40 ml. of acid-washed silica gel (column). Using 300 ml. of benzene and 300 ml. of a 9:1-mixture of benzene and ethyl acetate, by-products are washed out and the pure 2-(N-carbo - 2,2,2 - trichloro-ethoxy-amino) - 3,3 - dimethyl - 6 - (N-phenyloxyacetyl-amino) - 4 - thia - 1 - azabicyclo[3.2.0]heptan - 7 - one (configuration of 6 - amino-penicillanic acid) of the formula

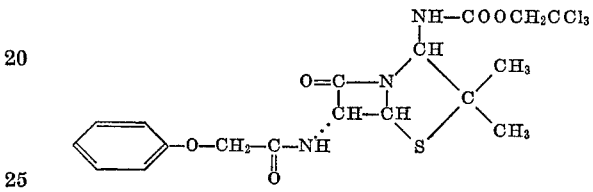

is eluted with 960 ml. of a 9:1-mixture of benzene and ethyl acetate. After recrystallization from a mixture of ether and pentane, the product melts at 169–171° (decomposition): $[\alpha]_D^{20} = +83°$ (c.=1.015 in chloroform); thin layer chromatogram (silica gel): Rf=0.5 in a 1:1-mixture of benzene and ethyl acetate; infra-red absorption spectrum (in methylene chloride): characteristic bands at 3.05μ, 5.62μ, 5.77μ, 5.93μ, 6.27μ, 6.62μ, 6.70μ, 8.30μ, 9.23μ, and 9.50μ.

Instead of the above-mentioned 2-(N-carbo-2,2,2-tri-chloroethoxy-amino) - 3,3 - dimethyl - 6 - (N-phenyloxy-acetyl-amino) - 4 - thia - 1 - azabicyclo[3.2.0]heptan-7-one it is also possible to use as an intermediate, the corresponding 2-(N-carbo - 2,2 - dichloroethoxy-amino)-3,3-dimethyl - 6 - (N-phenyloxyacetyl-amino) - 4 - thia-1-azabicyclo[3.2.0]heptan-7-one (configuration of 6-amino-penicillanic acid) of the formula

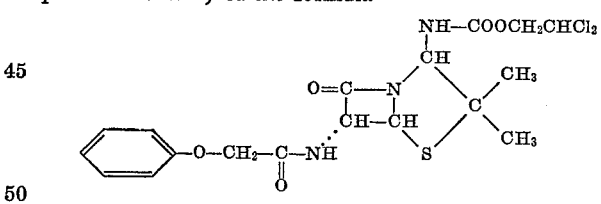

which after recrystallization from methylene chloride and ether melts at 145–147°;

$$[\alpha]_D^{20} = +89° \pm 1°$$

(c.=0.963 in chloroform); infra-red absorption spectrum (in methylene chloride): characteristic bands at 3.03μ, 5.60μ, 5.78μ, 5.93μ, 6.27μ, 6.60μ, 6.72μ, 8.28μ and 9.51μ.

EXAMPLE 9

15 ml. of a sulfonic acid type of ion exchanger (H⊕-form) are converted to the triethylammonium salt form by treatment with a solution of 5 ml. of triethylamine in 100 ml. of water, the column is washed with 300 ml. of water until neutral and treated with a solution of 2 g. of the sodium salt of penicillin-G in 10 ml. of water, and thereafter eluted with water. A total of 45 ml. is taken and the solution is lyophilized at a presure of 0.01 mm. Hg. The crude triethylammonium salt of penicillin-G thus obtained is dissolved in methylene chloride and the solution is dried over sodium sulfate, filtered and evaporated.

A solution of the penicillin-G triethylammonium salt obtainable in this manner, in a mixture of 40 ml. of methylene chloride and 40 ml. of tetrahydrofuran, is cooled to −10° and slowly mixed with 2.9 ml. of a 10 ml.-solution of 2 ml. of chloroformic acid ethyl ester in tetrahydrofuran while stirring. The mixture is stirred for 90 minutes at —5° to 0°, then mixed with a solution of 0.395 g. of sodium azide in 4 ml. of water, and the mixture is stirred for 30 minutes at —5° to 0°. It is diluted with 100 ml. of ice water and extracted three times with 75 ml. of methylene chloride at a time; the organic extracts are washed with water, dried and evaporated at room temperature under reduced pressure. The amorphous penicillin-G azide is thus obtained, infra-red absorption spectrum (in methylene chloride): characteristic bands at $3.05\mu$, $4.71\mu$, $5.62\mu$, $5.80\mu$, $5.94\mu$, $6.69\mu$ and $8.50\mu$.

A solution of 1.72 g. of the penicillin-G azide in 30 ml. of benzene is mixed with 1.5 ml. of 2,2,2-trichloroethanol and stirred for 25 hours at 70°. During the first 15 minutes a continuous evolution of nitrogen is observed and after a few hours the product separates out from the solution. The mixture is diluted with 60 ml. of hexane while stirring, cooled, and filtered after 15 minutes. The filter residue is washed with a 2:1-mixture of benzene and hexane and with cold ether. The pure 2-(N-carbo-2,2,2-trichloroethoxy-amino) - 3,3 - dimethyl - 6 - (N-phenyl-acetyl-amino) - 4 - thia - 1 - azabicyclo[3.2.0]heptan-7-one (configuration of 6-amino-penicillanic acid) of the formula

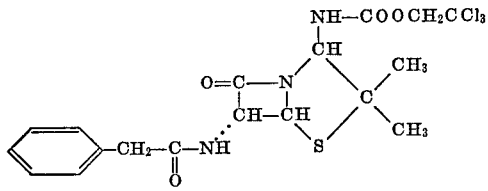

M.P. 223–223.5°, is thus obtained; $[\alpha]_D^{20} = +172°$ (c.=1.018 in ethanol); infra-red absorption spectrum (in methylene chloride): characteristic bands at $3.04\mu$, $5.61\mu$, $5.77\mu$, $6.57\mu$, $6.70\mu$, $8.30\mu$, $9.17\mu$, $9.62\mu$ and $11.85\mu$.

The product can also be obtained by warming 0.03 g. of penicillin-G azide in 2 ml. of benzene to 70° for 20 minutes, and forming the 2-isocyanato-3,3-dimethyl-6-(N-phenylacetyl-amino)-4-thia - 1 - azabicyclo[3.2.0]heptan-7-one (configuration of 6-amino-penicillanic acid) by evaporating the reaction mixture under reduced pressure; infra-red absorption spectrum (in methylene chloride): characteristic bands at $3.06\mu$, $4.48\mu$, $5.62\mu$, $5.96\mu$ and $6.70\mu$; and converting this, in accordance with the process indicated in Example 8, by reaction with 2,2,2-trichloro-ethanol into the desired 2-(N-carbo-2,2,2-trichloroethoxy-amino)-3,3-dimethyl-6-(N-phenylacetyl-amino) - 4 - thia-1-azabicyclo[3.2.0]heptan - 7 - one (configuration of 6-amino-penicillanic acid).

EXAMPLE 10

A suspension of 0.5 g. of crude 6-amino-penicillanic acid in 4 ml. of chloroform (freshly distilled over phosphorus pentoxide) is treated with 1 ml. of hexamethyl-disilazane of the formula [(CH$_3$)$_3$Si]$_2$NH and 1 ml. of chloroform (dried over phosphorus pentoxide); the reaction mixture is boiled under reflux for 2½ hours with exclusion of atmospheric moisture, is then cooled to 0°, and, after the addition of 1.7 ml. of a 10 ml.-solution of 2 ml. of triethylamine in chloroform, is treated with 0.385 g. of distilled fluoroformic acid tert.-butyl ester. The mixture is kept for 30 minutes at 0° and then for 90 minutes at room temperature and is diluted with cold methylene chloride. The organic solution is washed with a cold 10% aqueous citric acid solution and water, with the aqueous wash solutions being back-washed with cold methylene chloride. The combined organic extracts are twice extracted with a dilute aqueous sodium hydrogen carbonate solution and, immediately after separation, are acidified with citric acid in the presence of methylene chloride and at 0°. The organic phase is separated, dried and evaporated; the pure amorphous 6-(N-carbo-tert.-butyloxy-amino)-penicillanic acid is thus obtained; infra-red absorption spectrum (in methylene chloride): characteristic bands at $3.04\mu$, $5.63\mu$, $5.82\mu$, $6.67\mu$, $7.32\mu$ and $8.60\mu$; and is immediately used without purification.

The resulting 6 - (N - carbo-tert.-butyloxy-amino)-penicillanic acid is dissolved in 10 ml. of methylene chloride and treated with 0.43 ml. of a 10 ml.-solution of 2 ml. of triethylamine in methylene chloride. On evaporation the 6-(N-carbo-tert.-butyloxy-amino)-pencillanic acid triethylammonium salt is obtained as an amorphous residue; infra-red absorption spectrum (in methylene chloride): characteristic bands at $3.05\mu$, $5.67\mu$, $5.85\mu$, $6.17\mu$, $6.67\mu$, $7.32\mu$ and $8.53\mu$.

A solution of 0.226 g. of the 6-(N-carbo-tert.-butyloxy-amino)-penicillanic acid triethylammonium salt in 5 ml. of tetrahydrofuran is mixed at —10° with 0.26 ml. of a 10 ml.-solution of 2 ml. of chloroformic acid ethyl ester in tetrahydrofuran. After stirring for 90 minutes at —5° to —10°, the mixture is treated with a solution of 0.04 g. of sodium azide in 0.4 ml. of water. The mixture is stirred for a further 30 minutes at —5° to 0° and is then diluted with 20 ml. of ice-water and extracted with methylene chloride. The organic extract is dried and evaporated under reduced pressure at a temperature below 25°; the crude 6-(N-carbo-tert.-butyloxy-amino)-pencillanic acid azide is obtained as the residue; infra-red absorption spectrum (in methylene chloride): characteristic bands at $3.03\mu$, $4.70\mu$, $5.62\mu$, $5.83\mu$, $6.16\mu$, $7.32\mu$, $8.60\mu$ and $9.40\mu$.

The crude product obtained above is dissolved in 5 ml. of benzene, stirred for 5 minutes at 70°, and a small amount of the solvent is evaporated; according to the infra-red spectrum (in methylene chloride: characteristic bands at $3.03\mu$, $4.48\mu$, $5.61\mu$, $5.83\mu$, $6.67\mu$, $7.31\mu$, $7.55\mu$ and $8.62\mu$), the rearrangement to give the 2-isocyanato-3,3-dimethyl-6-(N-carbo-tert.-butyloxy-amino) - 4 - thia-1-azabicyclo[3.2.0]heptan-7-one (configuration of 6-amino-penicillanic acid) is complete. The warm benzene solution is mixed with 0.2 ml. of 2,2,2-trichloroethanol; the reaction mixture is stirred for a further 90 minutes at 70° and is then evaporated under reduced pressure. The 2-(N-carbo-2,2,2-trichloroethoxy-amino) - 3,3 - dimethyl-6-(N-carbo-tert.-butyloxy-amino)-4 - thia - 1 - azabicyclo [3.2.0]heptan-7-one (configuration of 6-amino-penicillanic acid) of the formula

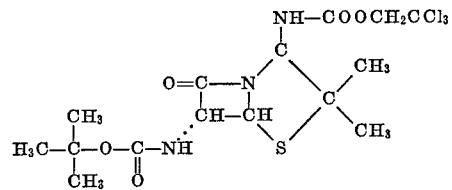

is thus obtained as a crystalline product which after recrystallization from a mixture of ether and pentane melts at 165–167°; infra-red absorption spectrum (in methylene chloride): characteristic bands at $3.04\mu$, $5.63\mu$, $5.81\mu$, $5.84\mu$, $6.69\mu$, $7.34\mu$, $8.65\mu$, $9.16\mu$ and $9.59\mu$.

The compounds obtained in accordance with the invention can, for example, be used as starting materials in the following manner:

EXAMPLE 11

A solution of 0.065 g. of 2-hydroxy-3,3-dimethyl-6-(N-phenyloxyacetyl-amino)-4-thia - 1 - azabicyclo[3.2.0] heptan-7-one (configuration of 6-amino-penicillanic acid) in 5 ml. of benzene is treated with 0.15 g. of lead tetra-acetate containing 10% of acetic acid, and the yellow solution is irradiated by means of a high pressure mercury vapour lamp (80 watts) in a water-cooled Pyrex glass jacket. After 10 minutes the yellow color disappears and a partially flocculent and white, partially gum-like and yellow precipitate forms. The mixture is diluted with benzene, washed with water, a dilute aqueous sodium hydrogen carbonate solution and water, and evaporated under reduced pressure. The 1-formyl-2α-(2-acetyloxy-2-propylmercapto) - 3α - (N - phenyloxyacetyl-amino)-azetidin-4-one of the formula

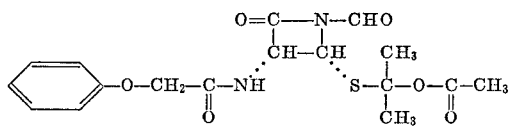

is thus obtained as a slightly yellowish gum-like product; infra-red absorption spectrum (in methylene chloride): characteristic bands at 3.05μ, 5.56μ, 5.78μ, 5.90μ, 6.27μ, 6.62μ, 6.71μ, 7.33μ, 7.67μ, 8.92μ, 9.24μ and 9.82μ.

EXAMPLE 12

A solution of 0.1 g. of 2-hydroxy-3,3-dimethyl-6-(N-phenylacetyl-amino) - 4 - thia-1-azabicyclo[3.2.0]heptan-7-one (configuration of 6-amino-penicillanic acid) in 10 ml. of benzene is treated with 0.24 g. of lead tetraacetate containing 10% of acetic acid, and the yellow mixture is irradiated, while stirring at 10°, by means of a high pressure mercury vapour lamp (80 watts) in a water-cooled Pyrex glass jacket. After 20 minutes no further tetravalent lead compound can be detected and the reaction mixture is colorless, with a yellowish precipitate having settled on the walls of the vessel. The mixture is diluted with benzene, washed with water and a dilute aqueous sodium hydrogen carbonate solution and evaporated under reduced pressure at a temperature below 25–30°. The amorphous 1-formyl-2α-(2-acetyloxy-2-propyl - mercapto)-3α-(N-phenylacetyl-amino)-azetidin-4-one of the formula

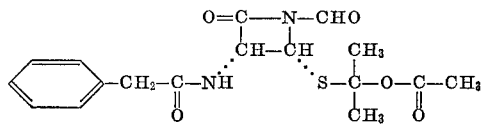

is thus obtained; infra-red absorption spectrum (in methylene chloride): characteristic bands at 3.04μ, 5.56μ, 5.78μ, 5.87μ, 6.69μ, 7.33μ, 7.68μ, 8.57μ, 8.93μ and 9.84μ.

EXAMPLE 13

A solution of 0.3 g. of 2-hydroxy-3,3-dimethyl-6-(N-carbo-tert.-butyloxy-amino)-4-thia - 1 - azabicyclo[3.2.0]heptan-7-one (configuration of 6-amino-penicillanic acid) in 125 ml. of anhydrous benzene is mixed with 1 g. of vacuum-dried lead tetraacetate and 0.09 ml. of pyridine and the mixture is irradiated at about 12–15° with a high pressure mercury vapour lamp (Hanau; type Q 81; 80 watts) in a water-cooled Pyrex glass jacket, while keeping it agitated by passing a stream of oxygen-free nitrogen through it. A white precipitate of lead diacetate forms; a small quantity of a gum-like black product which very probably contains metallic lead deposits on the Pyrex glass jacket and is scraped off from time to time. After 1 hour the entire quantity of lead tetraacetate has been consumed; the mixture is filtered and the filtrate is washed with a dilute aqueous sodium hydrogen carbonate solution and with water, dried and evaporated under reduced pressure. The crude 1-formyl-2α-(2-acetyloxy-2-propyl-mercapto)-3α-(N-carbo-tert. - butyloxy - amino)-azetidin-4-one of the formula

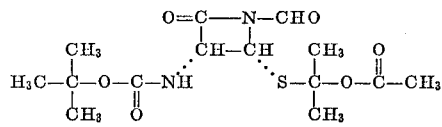

is obtained as an amorphous product and is further processed without purification; infra-red absorption spectrum (in methylene chloride): characteristic bands at 3.04μ, 5.56μ, 5.88μ, 6.70μ, 7.33μ and 8.70μ.

EXAMPLE 14

A solution of 0.5 g. of the hydrate of 2-hydroxy-3,3-dimethyl - 6 - (N - phenyloxyacetyl-amino)-4-thia-1-azabicyclo[3.2.0]heptan-7-one (configuration of 6-amino-penicillanic acid) in 125 ml. of anhydrous benzene is treated with 1.15 g. of lead tetraacetate (containing 10% of acetic acid) and the mixture is irradiated at about 15° with a high pressure mercury vapour lamp (80 watts) in a water-cooled Pyrex glass jacket, with a slow stream of oxygen-free nitrogen being passed through. After 1¼ hours the originally yellow solution becomes colorless; the reaction on potassium iodide-starch paper is negative. The reaction mixture is filtered and the filtrate is diluted with benzene and washed with water, a dilute aqueous sodium hydrogen carbonate solution and water, dried and evaporated under reduced pressure. The residue contains the 1-formyl - 2α - (2 - acetyloxy-2-propyl-mercapto)-3α-(N-phenyloxyacetyl-amino)-azetidin-4-one which is further processed without purification.

EXAMPLE 15

A solution of 1 g. of the hydrate of 2-hydroxy-3,3-dimethyl-6-(N - phenyloxyacetyl - amino) - 4 - thia-1-azabicyclo[3.2.0]heptan-7-one (configuration of 6-amino-penicillanic acid) in 125 ml. of anhydrous benzene is treated with 0.3 ml. of pyridine and 2.6 g. of lead tetraacetate which has been dried under reduced pressure; the mixture is irradiated at about 15° with a high pressure mercury vapour lamp (80 watts) in a water-cooled Pyrex glass jacket, with a slow stream of nitrogen (pyrogallol-washed) being passed through. After 3 hours the test on potassium iodide-starch paper is only slightly positive. The mixture is filtered, washed with 100 ml. of a dilute aqueous sodium hydrogen carbonate solution and 100 ml. of water, dried and evaporated under reduced pressure; the crude product contains the 1-formyl-2α-(2-acetyloxy-2-propyl-mercapto) - 3α - (N - phenyloxyacetyl-amino)-azetidin-4-one, which is further processed without purification.

EXAMPLE 16

A solution of 0.5 g. of the hydrate of 2-hydroxy-3,3-dimethyl - 6 - (N-phenyloxyacetyl - amino)-4-thia-1-azabicyclo[3.2.0]heptan-7-one (configuration of 6-amino-penicillanic acid) and 2.1 g. of lead tetrabenzoate in 160 ml. of anhydrous benzene, through which a stream of oxygen-free nitrogen is passed, is irradiated with a high pressure mercury vapour lamp (Hanau Q 81; 70 watts) at 15° in a water-cooled Pyrex glass jacket. The originally dark yellow solution becomes colorless after about 1½ hours; only a small quantity of a flocculent precipitate forms which is filtered off. The filtrate is washed with water, a dilute aqueous sodium hydrogen carbonate solution and again with water, dried and evaporated under reduced pressure. The residue containing the 1-formyl-2α-(2-benzoyloxy - 2 - propyl-mercapto)-3α-(N-phenyl-oxyacetyl-amino)-azetidin-4-one of the formula

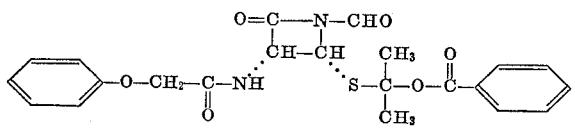

is further processed without purification.

EXAMPLE 17

A solution of 0.18 g. of 2-hydroxy-3,3-dimethyl-6-(N-phenyloxyacetyl-amino) - 4 - thia - 1 - azabicyclo[3.2.0]heptan-7-one hydrate (configuration of 6-amino-penicillanic acid) in 5 ml. of tetrahydrofuran is mixed at 0° with 0.3 ml. of a solution of 0.38 g. of sodium borohydride in 5 ml. of water. The mixture is stirred for 20 minutes at 0°, then adjusted to pH~4 by adding 12 drops of acetic acid and is diluted with 50 ml. of methylene chloride. The orgnic solution is twice washed with a saturated aqueous sodium chloride solution, the aqueous solutions are back-washed with methylene chloride and the combined organic solutions are dried and evaporated under reduced pressure. The crystalline residue is recrystallized from a mixture of methylene chloride and ether, whereupon the 2α-(2-hydroxymethyl-2-propyl-mercapto) - 3α - (N-phenyloxyacetyl-amino)-azetidin-4-one of the formula

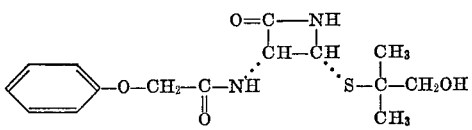

is obtained which after repeated recrystallization is obtained in needles, M.P. 156–157°; $[\alpha]_D^{20}= +130° \pm 1°$ (c.=0.708 in chloroform); infra-red absorption spectrum (in methylene chloride): characteristic bands at 3.03μ, 5.65μ, 5.94μ, 6.26μ, 6.58μ, 6.70μ 8.15μ, 8.27μ and 9.43μ.

EXAMPLE 18

A solution of 0.3 g. of 2-hydroxy-3,3-dimethyl-6-(N-phenylacetyl-amino) - 4 - thia - 1 - azabicyclo[3.2.0]-7-one (configuration of 6-amino-penicillanic acid) in 8 ml. of tetrahydrofuran is treated at 0° with 0.5 ml. of a solution of 0.38 g. of sodium borohydride in 5 ml. of water. The reaction mixture is stirred for 20 minutes at 0° and is then acidified with 20 drops of acetic acid and diluted with 50 ml. of methylene chloride. The organic solution is washed with a saturated aqueous sodium chloride solution, dried and evaporated. The residue, after crystallization from benzene, yields the 2α-(2-hydroxymethyl-2-propyl-mercapto) - 3α - (N - phenyl-acetyl-amino)-azetidin-4-one of the formula

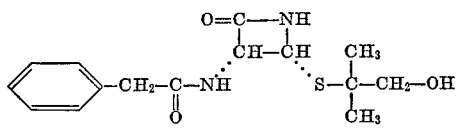

which melts at 120–133°; infra-red absorption spectrum (in methylene chloride): characteristic bands at 3.05μ, 3.15μ, 5.65μ, 6.00μ, 6.65μ, 7.45μ and 9.45μ.

EXAMPLE 19

A solution of 0.08 g. of 2-hydroxy-3,3-dimethyl-6-(N-carbo - tert. - butyloxy-amino) - 4 - thia - 1 - azabicyclo-[3.2.0]heptan-7-one (configuration of 6-amino-penicillanic acid) in 5 ml. of tetrahydrofuran is mixed at 0° with 0.13 ml. of a solution of 0.38 g. of sodium borohydride in 5 ml. of water. The reaction mixture is stirred for 20 minutes at room temperature and is then acidified with 5 drops of acetic acid and diluted with methylene chloride. The organic phase is washed with a saturated aqueous sodium chloride solution, dried and evaporated under reduced pressure. The residue is chromatographed on 0.5 g. of acid-washed silica gel, apolar by-products being eluted with 5 ml. each of benzene and 9:1- and 4:1-mixtures of benzene and ethyl acetate, and the amorphous 2α-(2-hydroxymethyl-2-propylmercapto) - 3α - (N-carbo-tert.-butyloxy-amino)-azetidin-4-one of the formula

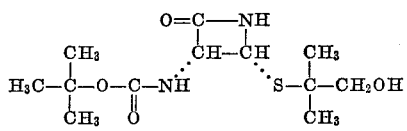

being eluted with 10 ml. of a 1:1-mixture of benzene and ethyl acetate and with 5 ml. of ethyl acetate; infra-red absorption spectrum (in methylene chloride): characteristic bands at 3.03μ, 5.63μ, 5.83μ, 6.63μ, 7.31μ, 8.60μ and 9.43μ.

EXAMPLE 20

A solution of 0.05 g. of 2α-(2-hydroxymethyl-2-propyl-mercapto) - 3α - (N-phenyloxyacetyl-amino)-azetidin-4-one in a mixture of 0.5 ml. of acetic acid anhydride and 0.1 ml. of pyridine is left to stand at room temperature for 1½ hours. The volatile portion is then distilled off under an oil pump vacuum; after adding a few ml. of toluene, the solvent is again distilled off. The 2α-(2-acetyl-oxy - methyl - 2 - propyl - mercapto)-3α-(N-phenyloxyacetyl-amino)-azetidin-4-one of the formula

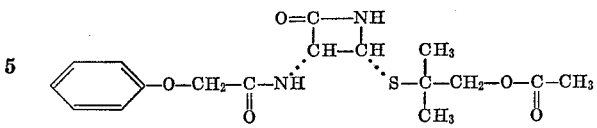

is obtained in crystalline form and is recrystallized from a mixture of methylene chloride and ether M.P. 122°; $[\alpha]_D^{20}= -38° \pm 1°$ (c.=0.988 in chloroform); characteristic bands at 3.05μ, 5.64μ, 5.77μ, 5.93μ, 6.26μ, 6.58μ, 6.71μ, 7.27μ and 8.15μ.

EXAMPLE 21

A solution of 0.056 g. of 2α-(2-hydroxymethyl-2-propylmercapto) - 3α - (N-phenyloxyacetyl-amino)-azetidin-4-one in 1 ml. of tetrahydrofuran is treated with 0.2 ml. of a solution of 2 ml. of chloroformic acid ethyl ester diluted to a volume of 10 ml. with tetrahydrofuran, and with 0.1 ml. of pyridine, the mixture being stirred at room temperature. A gum-like precipitate immediately forms and solidifies during the course of the reaction. After 4 hours, the mixture is diluted with methylene chloride, washed with water, dried and evaporated under reduced pressure. The 2α - (2 - ethyloxy-carbonyloxymethyl-2-propylmercapto) - 3α - (N-phenyloxyacetyl-amino)-azetidin-4-one of the formula

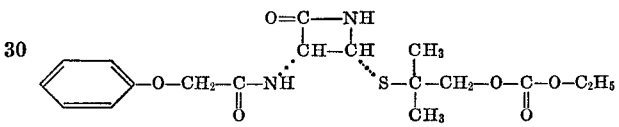

is thus obtained, which after recrystallization from a mixture of methylene chloride and ether melts at 103–105°; $[\alpha]_D^{20}= +11 \pm 1°$ (c.=1.133 in chloroform); infra-red absorption spectrum (in methylene chloride): characteristic bands at 3.05μ, 5.63μ, 5.75μ, 5.94μ, 6.27μ, 6.60μ, 6.72μ, 8.18μ and 9.88μ.

EXAMPLE 22

A solution of 0.4 g. f 2α-(2-hydroxymethyl-2-propylmercapto)-3α-(N - phenyloxyacetyl-amino)-azetidin-4-one and 0.52 g. of 2,2,2-trichloroethoxy-carbonyl chloride in 6 ml. of dry tetrahydrofuran is slowly mixed at 0°, while stirring, with a solution of 0.61 ml. of pyridine in 4 ml. of dry tetrahydrofuran. After completion of the addition, the mixture is stirred for 3 hours and then diluted with 100 ml. of methylene chloride; the organic solution is washed with water, dried and evaporated. The residue is chromatographed on 40 g. of acid-washed silica gel. By-products, mainly bis-2,2,2-trichloroethyl carbonate, are eluted with benzene, as well as 9:1- and 4:1-mixtures of benzene and ethyl acetate. The 2α-[2-(2,2,2-trichloroethoxy-carbonyloxy-methyl - 2 - propylmercapto]-3α-(N-phenyloxyacetyl-amino)-azetidin-4-one of the formula

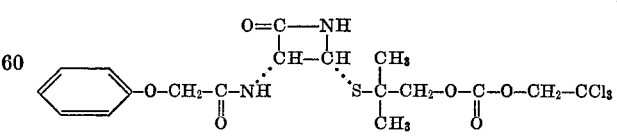

is eluted with a 1:1-mixture of benzene and ethyl acetate and recrystallized from a mixture of ether and pentane, M.P. 93–95°; $[\alpha]^{20}=-6°\pm1°$ (c.=1.17 in chloroform); infra-red absorption spectrum (in methylene chloride): characteristic bands at 3.03μ, 5.63μ, 5.68μ, 5.92μ, 6.26μ, 6.69μ, 6.70μ, 7.25μ and 8.08μ.

EXAMPLE 23

A solution of 0.02 g. of 2α-(2-hydroxymethyl-2-propylmercapto) - 3α - (N-phenyloxyacetyl-amino)-azetidin-4-one in a mixture of 0.2 ml. of acetic acid anhydride and 0.05 ml. of pyridine is heated for 5½ hours at 70° under anhydrous conditions. The solvents are evaporated at a pressure of 1 mm. Hg; the residue is dissolved in toluene and the solvent is again evaporated off under reduced pressure. The 1-acetyl-2α-(2-acetyloxymethyl-2-propyl-mercapto) - 3α - (N-phenyloxyacetyl-amino)-azetidin-4-one of the formula

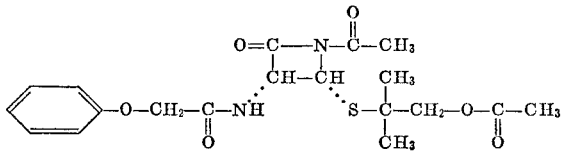

is obtained as a colorless amorphous residue; Rf=0.55 (silica gel plates; ethyl acetate); infra-red absorption spectrum (in methylene chloride): characteristic bands at 3.05μ, 5.58μ, 5.77μ, 5.84μ, 5.92μ, 6.27μ, 6.62μ, 6.72μ, and 7.29μ.

EXAMPLE 24

A suspension of 0.08 g. of 2α-(2-hydroxymethyl-2-propyl-mercapto)-3α-(N-phenyloxyacetyl-amino) - azetidin-4-one in 25 ml. of anhydrous benzene is treated with 0.3 g. of lead tetraacetate containing 10% of acetic acid and irradiated at about 10° with a high pressure mercury vapour lamp (80 watts) in a water-cooled Pyrex glass jacket, while stirring. After 45 minutes, no further tetravalent lead compound can be detected with potassium iodide-starch paper. The precipitate forming on the walls of the vessel during the reaction is scraped off from time to time. 1 g. of "polystyrene-Hünig base" (manufactured by warming a mixture of 100 g. of chloromethylpolystyrene [J. Am. Chem. Soc. 85, 2149 (1963)], 500 ml. of benzene, 200 ml. of methanol and 100 ml. of diisopropylamine to 150° while shaking, filtering, washing with 1000 ml. of methanol, 1000 ml. of a 3:1-mixture of dioxane and triethylamine, 1000 ml. of methanol, 1000 ml. of dioxane and 1000 ml. of methanol, and drying for 16 hours at 100°/100 mm. Hg; the product neutralizes 1.55 milliequivalents of hydrochloric acid per 1 g. in a 2:1-mixture of dioxane and water) is added to the mixture, which is stirred for 5 minutes and filtered, and the filtrate is evaporated at about 30–40° under reduced pressure. The residue contains the 2α-(2-acetyloxy-2-propylmercapto)-3α-(N-phenyloxyacetyl-amino)-azetidin-4-one of the formula

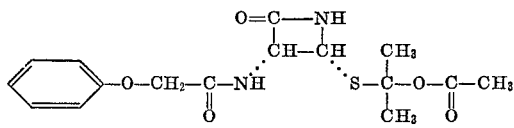

which is processed without additional purification.

The 2α - (2-hydroxymethyl-2-propylmercapto)-3α-(N-carbo-tert.-butyloxy-amino)-azetidin-4-one can be converted to the 2α-(2-acetyloxy-2-propylmercapto)-3α-(N-carbo-tert.-butyloxy-amino)-azetidin-4-one in a similar manner by treatment with lead tetraacetate.

EXAMPLE 25

A mixture of 0.12 g. of 1-formyl-2α-(2-acetyloxy-2-propyl-mercapto) - 3α - (N-phenyloxy-acetyl-amino)-azetidin-4-one in 12 ml. of anhydrous benzene is heated for 6½ hours to 80° and is then evaporated under reduced pressure. The 1-formyl - 2α - isopropenylmercapto-3α-(N-phenyloxyacetyl-amino)-azetidin-4-one of the formula

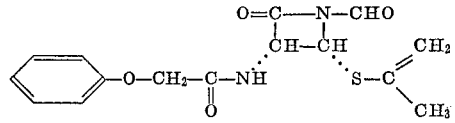

is obtained as a slightly yellowish, oily product which can be purified by chromatography on acid-washed silica gel and elution with a 9:1-mixture of benzene and ethyl acetate. The amorphous product shows the following characteristic bands in the infra-red absorption spectrum (in methylene chloride): 3.05μ, 5.56μ, 5.88μ, 6.28μ, 6.72μ and 7.68μ.

EXAMPLE 26

A mixture of 0.75 g. of 1-formyl-2α-(2-acetyloxy-2-propyl-mercapto) - 3α - (N-phenylacetyl-amino)-azetidin-4-one and 7.5 ml. of anhydrous benzene is boiled for 6½ hours under reflux and then evaporated under reduced pressure. The amorphous 1-formyl-2α-isopropenyl-mercapto - 3α - (N-phenylacetyl-amino)-azetidin-4-one of the formula

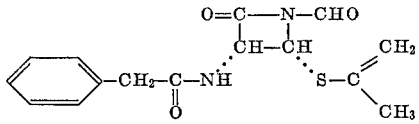

thus obtained shows characteristic bands at 3.05μ, 5.56μ, 5.90μ, 6.70μ and 7.70μ in the infra-red absorption spectrum (in methylene chloride).

EXAMPLE 27

The crude product resulting from the process of Example 13, containing the 1-formyl-2α-(2-acetyloxy-2-propyl-mercapto) - 3α - (N-carbo-tert.-butyloxy-amino)-azetidin-4-one, is dissolved in 15 ml. of toluene and heated for 17 hours in a nitrogen atmosphere at 90°. The mixture is evaporated under reduced pressure and the crude 1-formyl - 2α - isopropenylmercapto-3α-(N-carbo-tert.butyloxy-amino)-azetidin-4-one of the formula

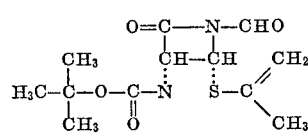

is obtained as an amorphous product which shows the following characteristic bands in the infra-red spectrum (in methylene chloride): 3.03μ, 5.55μ, 5.85μ, 6.69μ and 7.32μ.

EXAMPLE 28

The crude 1-formyl-2α-(2-acetyloxy-2-propyl-mercapto) - 3α-(N-phenyloxyacetyl-amino)-azetidin-4-one, obtainable according to the process of Example 14, is dissolved in 50 ml. of anhydrous benzene; the solution is kept at 80° for 17 hours and is again evaporated to dryness. Apart from a small quantity of 1-formyl-2α-(2-acetyloxy-2-propyl)-mercapto) - 3α - (N-phenyloxyacetyl-amino)-azetidin-4-one, the residue mainly contains 1-formyl-2α-isopropenylmercapto-3α-(N-phenyloxyacetylamino) - azetidin-4-one; the crude product is further processed without purification.

EXAMPLE 29

The crude 1-formyl-2α-(2-acetyloxy-2-propyl-mercapto)-3α-(N-phenyloxyacetyl-amino) - azetidin-4-one resulting from the process of Example 15 is dissolved in 50 ml. of toluene and kept for 16 hours at 90° under a nitrogen atmosphere and then evaporated under reduced pressure. The residue contains the 1-formyl-2α-isopropenylmercapto-3α(N-phenyloxyacetylamino)azetdin-4-one which is further processed without purification.

EXAMPLE 30

A solution of 0.741 g. of the residue resulting from the process of Example 16, containing 1-formyl-2α-(2-benzoyloxy - 2 - propylmercapto) - 3α - (N-phenyloxyacetyl-amino)-azetidin-4-one, in 25 ml. of toluene is heated for 16 hours at 90° and is then cooled and diluted with benzene. The organic solution is washed with a dilute aqueous sodium hydrogen carbonate solution and water, dried and evaporated under reduced pressure. The 1-formyl-2α-isopropenylmercapto - 3α - (N-phenyloxyacetyl-amino)-azetidin-4-one obtained as a residue is further processed without purification.

EXAMPLE 31

A solution of 0.051 g. of 1-formyl-2α-(2-acetyloxy-2-propyl-mercapto) - 3α - (N-phenyloxyacetyl-amino)-azetidin-4-one in 3 ml. of anhydrous benzene is treated with 0.13 g. of tris-triphenyl-phosphine-rhodium chloride and boiled for 3 hours under reflux. The initially red solution changes color to brown, with a small quantity of a precipitate forming. After cooling the precipitate is filtered off and the filtrate is evaporated under reduced pressure. The residue is chromatographed on 5 g. of acid-washed silica gel, with fractions of 5 ml. each being taken. Elution is carried out with 10 ml. of benzene, 30 ml. of a 9:1-, 25 ml. of a 4:1- and 10 ml. of a 1:1-mixture of benzene and ethyl acetate and then with 25 ml. of ethyl acetate. Fractions 2–6 yield a rhodium complex having a strong CO absorption at 5.18μ in the infra-red spectrum. A small quantity of 1-formyl-2α-isopropenyl-mercapto-3α-(N-phenyloxyacetyl-amino)-azetidin-4-one can be isolated from fractions 10–12, while from the fractions 15–17 the 2α-isopropenylmercapto-3α-(N-phenyloxyacetyl-amino)-azetidin-4-one of the formula

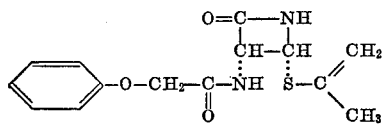

is obtained as an amorphous product. The product can be obtained in crystalline form when the eluate is filtered through 0.5 g. of acid-washed silica gel and washed out with a 1:1-mixture of benzene and ethyl acetate, M.P. 156–158°; $[\alpha]_D^{20}=-70°\pm2°$ (c.=0.665 in chloroform); infra-red absorption spectrum (in methylene chloride): characteristic bands at 3.07μ, 5.65μ, 5.96μ, 6.29μ, 6.59μ, 6.74μ, 8.19μ, 9.25μ and 9.92μ.

EXAMPLE 32

A solution of 0.35 g. of the crude 1-formyl-2α-isopropenyl-mercapto - 3α - (N-phenyloxyacetyl-amino) - azetidin-4-one, resulting from the process of Example 28, in 7.5 ml. of tetrahydrofuran is cooled to −15°, diluted with 7.5 ml. of methanol and treated dropwise over the course of 1 hour with 1 ml. of an 0.1 N aqueous sodium hydroxide solution. The reaction mixture is stirred for 20 minutes at −15° and is then diluted with 100 ml. of methylene chloride and washed with water; the aqueous solution is back-washed with methylene chloride. The combined organic solutions are dried and evaporated under reduced pressure. The residue is crystallized from benzene; the 2-α-isopropenylmercapto-3α-(N-phenyloxyacetyl-amino)-azetidin-4-one thus obtained melts at 157–158° after recrystallization from a mixture of methylene chloride and ether.

The residue from the mother liquors is chromatographed on 5 g. of acid-washed silica gel; apolar by-products are eluted with 20 ml. of benzene, 60 ml. of a 9:1-mixture of benzene and ethyl acetate and 50 ml. of a 4:1-mixture of benzene and ethyl acetate, and a further quantity of the 2α-isopropenylmercapto-3α-(N-phenyloxyacetyl-amino)-azetidin-4-one is eluted with a further 50 ml. of the same mixture of benzene and ethyl acetate; strongly polar substances are eluted with ethyl acetate.

EXAMPLE 33

The crude product resulting from the process of Example 29 and containing 1-formyl-2α-isopropenylmercapto-3α-(N-phenyloxyacetyl-amino)-azetidin-4-one, is dissolved in 45 ml, of methylene chloride, treated with 45 ml. of water and 0.9 ml. of concentrated aqueous ammonia and vigorously stirred at room temperature for 5 hours. The aqueous phase is washed twice with 50 ml. of methylene chloride at a time and the combined organic solutions are dried and evaporated under reduced pressure. The residue is recrystallized from a mixture of methylene chloride and ether and yields the pure 2α-isopropenylmercapto - 3α - (N - phenyloxyacetyl - amino) - azetidin-4-one, M.P. 157–160°. The semi-crystalline mother liquor is chromatographed on acid-washed silica gel and yields a further quantity of the desired product.

EXAMPLE 34

The crude 1 - formyl-2α-isopropenylmercapto-3α-(N-carbo-tert.-butyloxy-amino)-azetidin-4-one, obtainable resulting from the process of Example 27, is dissolved in 10 ml. of methylene chloride, and the solution is diluted with 10 ml. of water and treated with 10 drops of concentrated aqueous ammonia. The reaction mixture is vigorously stirred for 4 hours at room temperature and is then separated into the two layers; the aqueous phase is washed with methylene chloride and the organic solutions are combined, dried and evaporated. The residue is chromatographed on 15 g. of acid-washed silica gel, elution being carried out with chloroform. Less polar by-products are first eluted in the forerun, and then the desired 2α - isopropenylmercapto - 3α - (N - carbo-tert.-butyloxy-amino)-azetidin-4-one of the formula

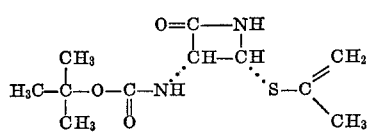

is obtained, which after crystallization from cold ether melts at 141° and after sublimation (128–132°/0.001 mm. Hg) at 142–144°; $[\alpha]_D=-26°\pm1°$ (c.=0.883 in chloroform); ultra-violet absorption spectrum (in ethanol): $\lambda_{max.}=223$ mμ (ε=4840); infra-red absorption spectrum (in methylene chloride): characteristic bands at 3.03μ, 5.63μ, 5.84μ, 6.22μ, 6.67μ, 7.32μ, 7.57μ, 8.64μ, 9.45μ and 11.65μ.

EXAMPLE 35

A solution of 0.56 g. of the crude 1-formyl-2α-isopropenyl - 3α - (N - phenyloxyacetyl - amino)-azetidin-4-one, resulting from the process of Example 30, in 20 ml. of methylene chloride is mixed with 20 ml. of water and 0.45 ml. of concentrated aqueous ammonia solution and the mixture is vigorously stirred for 4 hours at room temperature. The two layers are separated; the aqueous phase is washed with methylene chloride and the combined organic solutions are dried and evaporated. The crystalline residue is dissolved in chloroform and filtered through 4 g. of acid-washed silica gel, whereupon an apolar yellow fraction is first obtained, followed, on eluting with chloroform, by the pure crystalline 2α - isopropenyl - 3α - (N-phenyloxyacetyl-amino)-azetidin-4-one, M.P. 157–158°. The yellow fraction is chromatographed on 10 g. of acid-washed silica gel, elution being carried out with chloroform; after non-polar impurities, a further quantity of the desired product can thus be obtained.

EXAMPLE 36

Half of the crude product, obtainable according to the process of Example 24, containing 2α-(2-acetyloxy-2-propyl-mercapto) - 3α - (N - phenyloxyacetyl - amino)-azetidin-4-one, is dissolved in 5 ml. of anhydrous dioxane and the solution is kept for 17 hours at 100° and then evaporated under reduced pressure. The crude product is chromatographed on 1 g. of acid-washed silica gel. Apolar by-products are eluted with 10 ml. of benzene and 20 ml. of a 9:1-mixture of benzene and ethyl acetate, and the crystalline 2α-isopropenylmercapto - 3α - (N - phenyloxyacetyl-amino)-azetidin-4-one is eluted with 30 ml. of 4:1-mixture of benzene and ethyl acetate, M.P. 156–158°.

In a similar manner, 2α-isopropenylmercapto-3α-(N-carbo-tert.-butyloxy-amino)-azetidin-4-one is obtained on heating 2α - (2 - acetyloxy - 2 - propylmercapto)-3α-(N-carbo-tert.-butyloxy-amino)-azetidin-4-one.

EXAMPLE 37

A mixture of 0.1 g. of 1-formyl-2α-isopropenylmarcapto-3α-(N-phenyloxyacetyl-amino)-azetidin-4-one in 5 ml. of ethyl acetate is hydrogenated for 1 hour in the presence of 0.2 g. of a 10% palladium-on-charcoal catalyst and is then filtered, and the filtrate is evaporated under reduced pressure. The residue is purified by chromatography on 5 g. of acid-washed silica gel and the 1-formyl-2α-isopropyl - mercapto - 3α - (N-phenyloxyacetyl-amino)-azetidin-4-one of the formula

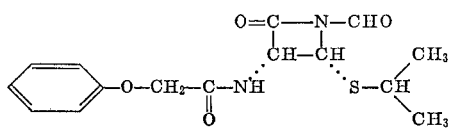

is eluted with a 4:1-mixture of benzene and ethyl acetate. 30% of the resulting product is starting material; the infra-red absorption spectrum (in methylene chloride) shows characteristic bands at 3.04μ, 5.56μ, 5.89μ, 6.26μ, 6.63μ, 6.72μ and 7.67μ.

EXAMPLE 38

A mixture of 0.5 g. of a 10% palladium-on-charcoal catalyst in 5 ml. of ethyl acetate is pre-hydrogenated at 25°, in the course of which 14.3 ml. of hydrogen are taken up. 0.063 g. of 1-formyl-2α- isopropenylmercapto-3α-(N-phenylacetyl-amino)-azetidin-4-one in 2 ml. of ethyl acetate are then added and the mixture is further hydrogenated for 2½ hours at 30°. After filtering and evaporating the solvent, the residue is chromatographed on 5 g. of acid-washed silica gel. By-products are eluted with 10 ml. of benzene and 10 ml. of a 4:1-mixture of benzene and ethyl acetate and with a further 15 ml. of the same mixture the 1-formyl-2α-isopropylmercapto-3α-(N-phenylacetyl-amino)-azetidin-4-one of the formua

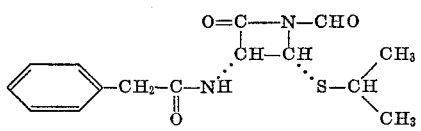

is obtained as a colorless oil which shows characteristic bands at 3.04μ, 5.56μ, 5.92μ, 6.18μ, 7.24μ and 7.68μ, in the infra-red absorption spectrum (in methylene chloride).

EXAMPLE 39

A solution of 0.08 g. of 2α-isopropenylmercapto-3α-(N-phenyloxyacetyl-amino)-azetidin-4-one in 10 ml. of ethyl acetate is stirred for 45 minutes in the presence of 0.1 g. of a 10% palladium-on-charcoal catalyst, in a hydrogen atmosphere; the absorption of the hydrogen ceases after about 25 minutes. The reaction mixtures is filtered and the filtrate is evaporated. The crystalline residue is recrystallized from a mixture of methylene chloride and ether; the resulting 2α - isopropylmercapto-3α-(N-phenyloxyacetyl-amino)-azetidin-4-one of the formula

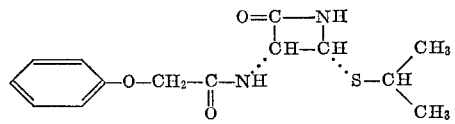

melts at 128–130° and 143° (double melting point); infra-red absorption spectrum (in methylene chloride): characteristic bands at 3.05μ, 5.63μ, 5.93μ, 6.26μ, 6.58μ, 6.70μ, 8.15μ, 9.21μ and 9.41μ.

EXAMPLE 40

A solution of 2α-isopropenylmercapto-3α-(N-carbo-tert.-butyloxy-amino)-azetidin-4-one in 0.5 ml. of cold trifluoroacetic acid is kept for 15 minutes at 0°; the solution turns slightly yellowish and is then diluted with a solution of 1 g. of crystalline sodium acetate in 2 ml. of water. The mixture is extracted three times with 10 ml. of methylene chloride at a time; the combined organic extracts are dried and evaporated under reduced pressure; the acetic acid is removed at 0.001 mm. Hg. The 4,4-dimethyl-azetidino[3.2.0-d]thiazolidin-2-one of the formula

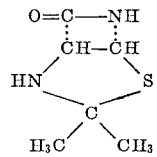

is obtained as a colorless oil which crystallizes on addition of benzene and melts at 115–117° after recrystallization from benzene; $[\alpha]_D^{20} = +8° \pm 1°$ (c.=0.845 in chloroform); thin layer chromatography (silica gel; system: 1:1-mixture of benzene and ethyl acetate): Rf=0.13; infrared absorption spectrum (in methylene chloride): characteristic bands at 2.95μ, 5.68μ (postassium bromide) and 5.78μ.

EXAMPLE 41

A solution of 0.15 g. of 4,4-dimethyl-azetidino[3,2-d] thiazolidin-2-one in 10 ml. of dry tetrahydrofuran (freshly filtered through a column of aluminum oxide, activity I) is cooled to 0°. Phosgene is passed through the cold solution for 5 minutes and the reaction mixture is stirred for a further 30 minutes and with the exclusion of atmospheric moisture; the precipitate which initially appears re-dissolves. The mixture is then evaporated and the residue is chromatographed on 3 g. of acid-washed silica gel. The desired 3-chlorocarbonyl-4,4-dimethyl-azetidino-[3.2-d]thiazolidin-2-one of the formula

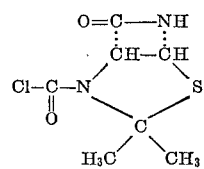

is eluted with benzene and with a 9:1-mixture of benzene and ethyl acetate and crystallizes spontaneously. It is recrystallized from a mixture of benzene and hexane and melts at 178–180° (transformation at 140–160°); infrared absorption spectrum (in methylene chloride): characteristic bands at 3.04μ, 5.62μ, 5.74μ, 7.48μ, 8.28μ and 11.84μ.

A solution of 0.1 g. of 3-chlorocarbonyl-4,4-dimethyl-azetidino[3,3-d]thiazolidine-2-one in 10 ml. of tert.-butanol is mixed with 0.2 g. of calcium carbonate and heated in a closed vessel for 2½ days at 90° bath temperature while stirring. After cooling the mixture is filtered, the residue is washed with benzene and the filtrate is evaporated under reduced pressure. The residue is taken up in benzene; the organic solution is washed with water, dried and again evaporated. The residue is again dissolved in benzene and chromatographed on 1 g. of acid-washed silica gel. The 3-carbo-tert.-butyloxy-4,4-dimethyl-azetidino[3.2-d]thiazolidin-2-one of the formula

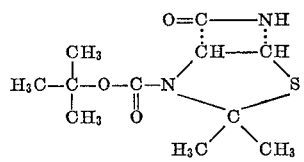

is eluted with 9:1- and 4:1-mixtures of benzene and ethyl acetate and recrystallized from a mixture of ether and pentane, melting point 117–120° (analytical preparation: 120.5°); $[\alpha]_D^{20} = -274°$ (c.=0.522 in chloroform); thin layer chromatography (silica gel; system: 1:1-mixture of benzene and ethyl acetate): Rf=0.15; infra-red absorption spectrum (in methylene chloride): characteristic bands at 2.95μ, 5.62μ, 5.90μ, 7.25μ, 7.35μ, 7.75μ, 8.65μ, 9.36μ, 10.60μ, 11.65μ and 12.30μ.

We claim:
1. A process for the manufacture of compounds of the formula

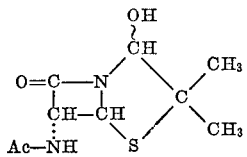

in which Ac is a member selected from the group consisting of lower alkanoyl, lower alkenoyl, phenylacetyl, 4-hydroxy-phenylacetyl, phenyloxyacetyl, carbo-lower alkoxy, carbo-adamantyloxy, carbo-phenyl-lower alkoxy and carbo-furfuryloxy, wherein a compound of the formula

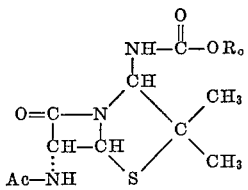

in which $R_0$ is a member selected from the group consisting of 2-chloro-lower alkyl having three chlorine atoms, 2-bromo-lower alkyl having three bromine atoms and 2-iodo-lower alkyl having one iodine atom, is treated under mild conditions with a member selected from the group consisting of zinc, a zinc alloy, zinc amalgam or magnesium in the presence of an aqueous acid or an aqeous alcohol, an alkali metal amalgam or aluminum amalgam in the presence of a moist solvent, and a chromium-II-salt in the presence of an aqueous solvent, at least one mol of water being present.

2. A process as claimed in claim 1, wherein starting materials are used, in which the radical $R_0$ represents a member selected from the group consisting of 2,2,2-trichloroethyl, 2,2,2-trichloro-1-methyl-ethyl and 2,2,2-tribromoethyl radical.

3. A process as claimed in claim 1, wherein a member selected from the group consisting of zinc, a zinc alloy, zinc amalgam and magnesium, in the presence of a member selected from the group consisting of an acid and an alcohol is used as reducing agent.

4. 2-hydroxy - 3,3 - dimethyl - 6 - (N-phenyloxyacetyl-amino)-4-thia-1-azabicyclo[3.2.0]heptan-7-one of the configuration of 6-amino-penicillanic acid.

5. 2 - hydroxy - 3,3 - dimethyl - 6 - (N - phenylacetyl-amino)-4-thia-1-azabicyclo[3.2.0]heptan-7-one of the configuration of 6-amino-penicillanic acid.

6. 2-hydroxy - 3,3 - dimethyl - 6 - (N-carbo-tert.-butyl-oxyamino)-4-thia-1-azabicyclo[3.2.0]heptan-7-one of the configuration of 6-amino-penicillanic acid.

7. A compound of the formula

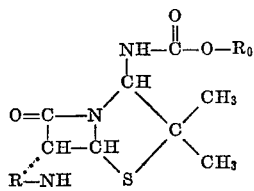

of the configuration of 6-amino-penicillanic acid, in which R is a member selected from the group consisting of hydrogen, lower alkanoyl, lower alkenoyl, phenylacetyl, 4-hydroxy-phenylacetyl, phenyloxyacetyl, carbo-lower alkoxy, carbo-adamantyloxy, carbophenyl-lower alkoxy and carbo-furfuryloxy and $R_0$ is a member selected from the group consisting of 2-chloro-lower alkyl having three chlorine atoms, 2-bromo-lower alkyl having three bromine atoms and 2-iodo-lower alkyl having one iodine atom.

8. A compound as claimed in claim 7, wherein $R_0$ is a member selected from the group consisting of a 2-polychloroethyl, 2-polybromoethyl and 2-iodoethyl radical.

9. A compound as claimed in claim 12, in which $R_0$ stands for 2,2,2-trichloroethyl.

10. 2-(N-carbo - 2,2,2 - trichloroethoxy-amino)-3,3-dimethyl-6-(N-phenyloxyacetyl-amino) - 4 - thia - 1 - azabicyclo[3.2.0]heptan-7-one of the configuration of 6-amino-penicillanic acid.

11. 2-(N-carbo - 2,2,2 - trichloroethoxy-amino)-3,3-dimethyl - 6 - (N-phenylacetyl-amino)-4-thia-1-azabicyclo-[3.2.0]heptan-7-one of the configuration of 6-amino-penicillanic acid.

12. 2-(N-carbo - 2,2,2 - trichloroethoxy-amino)-3,3-dimethyl-6-(N - carbo - tert. - butyloxy-amino) - 4 - thia-1-azabicyclo[3.2.0]heptan-7-one of the configuration of 6-amino-penicillanic acid.

13. A member selected from the group consisting of a compound of the formula

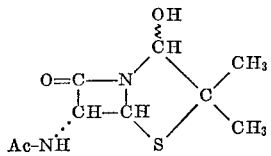

of the configuration of 6-amino-penicillanic acid, in which Ac is a member selected from the group consisting of lower alkanoyl, lower alkenoyl, phenylacetyl, 4-hydroxy-phenylacetyl, phenyloxyacetyl, carbo-lower alkoxy, carbo-adamantyloxy, carbo-phenyl-lower alkoxy and carbo-furfuryloxy and an O-ester of such compounds derived from an acid selected from the group consisting of methanesulfonic, ethanesulfonic, benzenesulfonic, toluenesulfonic, lower alkanecarboxylic, chloroacetic, cyclopentanecarboxylic, cyclohexanecarboxylic, cyclohexylacetic, benzoic, naphthoic, phenylacetic, phenylpropionic, cinnamic pyridinecarboxylic, furanecarboxylic, thiophenecarboxylic, 2-pyridylacetic, 2-thiopheneacetic and 3-(2-furyl)-propionic acid.

14. A process as claimed in claim 6, wherein zinc and acetic acid with the addition of water is used as reducing agent.

References Cited
UNITED STATES PATENTS 3,487,074 12/1969 Sheehan _____ 260—239.1
3,530,115 9/1970 Vogler _____ 260—239.1

NICHOLAS S. RIZZO, Primary Examiner

U.S. Cl. X.R.

424—271; 260—239